US011240320B2

(12) United States Patent
Milvaney et al.

(10) Patent No.: US 11,240,320 B2
(45) Date of Patent: Feb. 1, 2022

(54) SYSTEM AND METHOD FOR MANAGING NOTIFICATIONS OF DOCUMENT MODIFICATIONS

(71) Applicant: MICROSOFT TECHNOLOGY LICENSING, LLC, Redmond, WA (US)

(72) Inventors: Douglas Lane Milvaney, Somerville, MA (US); Benjamin Gustav Wilde, Quincy, MA (US); Joan Catharine Weaver, Somerville, MA (US); Christopher Ryan Botaish, Reading, MA (US); Lyndsy Marie Stopa, Lancaster, NY (US); Arthur David Berman, Waltham, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 16/194,020

(22) Filed: Nov. 16, 2018

(65) Prior Publication Data
US 2020/0162561 A1    May 21, 2020

(51) Int. Cl.
*G06F 16/30*      (2019.01)
*H04L 29/08*      (2006.01)
(Continued)

(52) U.S. Cl.
CPC ............ *H04L 67/147* (2013.01); *G06F 9/542* (2013.01); *G06F 40/166* (2020.01); *H04L 65/4023* (2013.01)

(58) Field of Classification Search
CPC ... G06F 16/9535; G06F 16/166; G06F 16/542
(Continued)

(56) References Cited

U.S. PATENT DOCUMENTS 8,566,301 B2    10/2013    Rueben et al.
8,738,706 B1     5/2014    Grieve et al.
(Continued)

FOREIGN PATENT DOCUMENTS

WO    2018200173 A1    11/2018

OTHER PUBLICATIONS

"Final Office Action Issued in U.S. Appl. No. 14/982,832", dated Oct. 30, 2019, 19 Pages.
(Continued)

*Primary Examiner* — Sana A Al-Hashemi
(74) *Attorney, Agent, or Firm* — NovoTechIP International PLLC

(57) ABSTRACT

A document modification event management system for notification of specific edits made to electronic content items, and a method of determining the relevance of the modification. As an example, a first user may make an edit to a portion of a document. A second user may receive a notification of this edit if the system determines the edit was relevant to the second user. In addition, during review of an electronic content item, a reader may select a specific portion of content and view the modifications that have occurred to only the selected portion. These tools can provide collaborative document users the ability to more readily monitor document development and stay up-to-date with changes that are important to them.

28 Claims, 14 Drawing Sheets

(51) Int. Cl.
*G06F 40/166* (2020.01)
*G06F 9/54* (2006.01)
*H04L 29/06* (2006.01)

(58) Field of Classification Search
USPC ........ 707/609, 687, 705, 769, 790, 813, 821
See application file for complete search history.

(56) References Cited

U.S. PATENT DOCUMENTS

| | | | |
|---|---|---|---|
| 8,739,021 | B2 | 5/2014 | Yuniardi |
| 9,053,079 | B2 | 6/2015 | Bailor et al. |
| 9,135,312 | B2 | 9/2015 | Greenspan et al. |
| 9,208,153 | B1 | 12/2015 | Zaveri et al. |
| 10,803,050 | B1* | 10/2020 | Salkola ................ G10L 15/187 |
| 2007/0060205 | A1 | 3/2007 | Kim |
| 2009/0217196 | A1* | 8/2009 | Neff .................... G06F 16/9535 715/799 |
| 2010/0023851 | A1 | 1/2010 | Schormann |
| 2012/0185762 | A1 | 7/2012 | Ozer et al. |
| 2012/0192086 | A1 | 7/2012 | Ghods et al. |
| 2012/0271867 | A1 | 10/2012 | Grossman et al. |
| 2012/0272151 | A1 | 10/2012 | Grossman et al. |
| 2013/0262420 | A1 | 10/2013 | Edelstein et al. |
| 2014/0033068 | A1 | 1/2014 | Gupta et al. |
| 2014/0279843 | A1 | 9/2014 | Von Weihe |
| 2014/0281872 | A1 | 9/2014 | Glover |
| 2014/0298198 | A1 | 10/2014 | Kuchibhotla et al. |
| 2015/0100580 | A1 | 4/2015 | Mathur et al. |
| 2015/0134600 | A1 | 5/2015 | Eisner et al. |
| 2015/0339282 | A1 | 11/2015 | Goyal |
| 2017/0185574 | A1 | 6/2017 | Fern et al. |
| 2017/0359331 | A1* | 12/2017 | Bonnet ............... H04L 63/0428 |
| 2018/0123815 | A1 | 5/2018 | Milvaney et al. |
| 2019/0266257 | A1* | 8/2019 | Natchu ................... G06F 16/95 |
| 2019/0325062 | A1* | 10/2019 | Rogulenko ......... G06F 16/2343 |
| 2020/0026772 | A1* | 1/2020 | Wheeler ............. G06F 16/9535 |
| 2020/0142545 | A1* | 5/2020 | Wald ..................... G06N 20/00 |

OTHER PUBLICATIONS

"Non Final Office Action Issued in U.S. Appl. No. 14/982,832", dated May 24, 2019, 20 Pages.

Belkadi, et al., "A Situation Model to Support Awareness in Collaborative Design", In International Journal of Human-Computer Studies, vol. 71, Issue 1, Jan. 1, 2013, pp. 110-129.

"International Search Report and Written Opinion Issued in PCT Application No. PCT/US2019/060373", dated Apr. 15, 2020, 13 Pages.

"Quip Changes the Way teams Work Together", Retrieved From: https://quip.com/about/tour, Retrieved Date: Oct. 9, 2015, 5 Pages.

"Revision Control—Wikipedia the free encyclopedia", Retrieved From: http://en.wikipedia.org/w/index.php?title=Revision_control &oldid=589765566, Jan. 8, 2014, 10 Pages.

"Team Up to Build Powerful Documents", Retrieved From: https://www.zoho.com/writer/, Retrieved Date: Oct. 9, 2015, 7 Pages.

"Final Office Action Issued in U.S. Appl. No. 14/982,832", dated Dec. 21, 2017, 17 Pages.

"Final Office Action Issued in U.S. Appl. No. 14/982,832", dated Nov. 9, 2018, 19 Pages.

"Non Final Office Action Issued in U.S. Appl. No. 14/982,832", dated May 9, 2018, 18 Pages.

"Non Final Office Action Issued in U.S. Appl. No. 14/982,832", dated Jul. 21, 2017, 17 Pages.

Bendix, et al., "VTML for Fine-Grained Change Tracking in Editing Structured Documents", In Proceedings of 9th International Symposium on System Configuration Management, Sep. 5, 1999, 18 Pages.

"International Search Report and Written Opinion Issued in PCT Application No. PCT/US2016/066743", dated Apr. 6, 2017, 18 Pages.

Somers, James, "How I Reverse Engineered Google Docs", Retrieved From: http://features.jsomers.net/how-i-reverse-engineered-google-docs/, Nov. 5, 2014, 11 Pages.

* cited by examiner

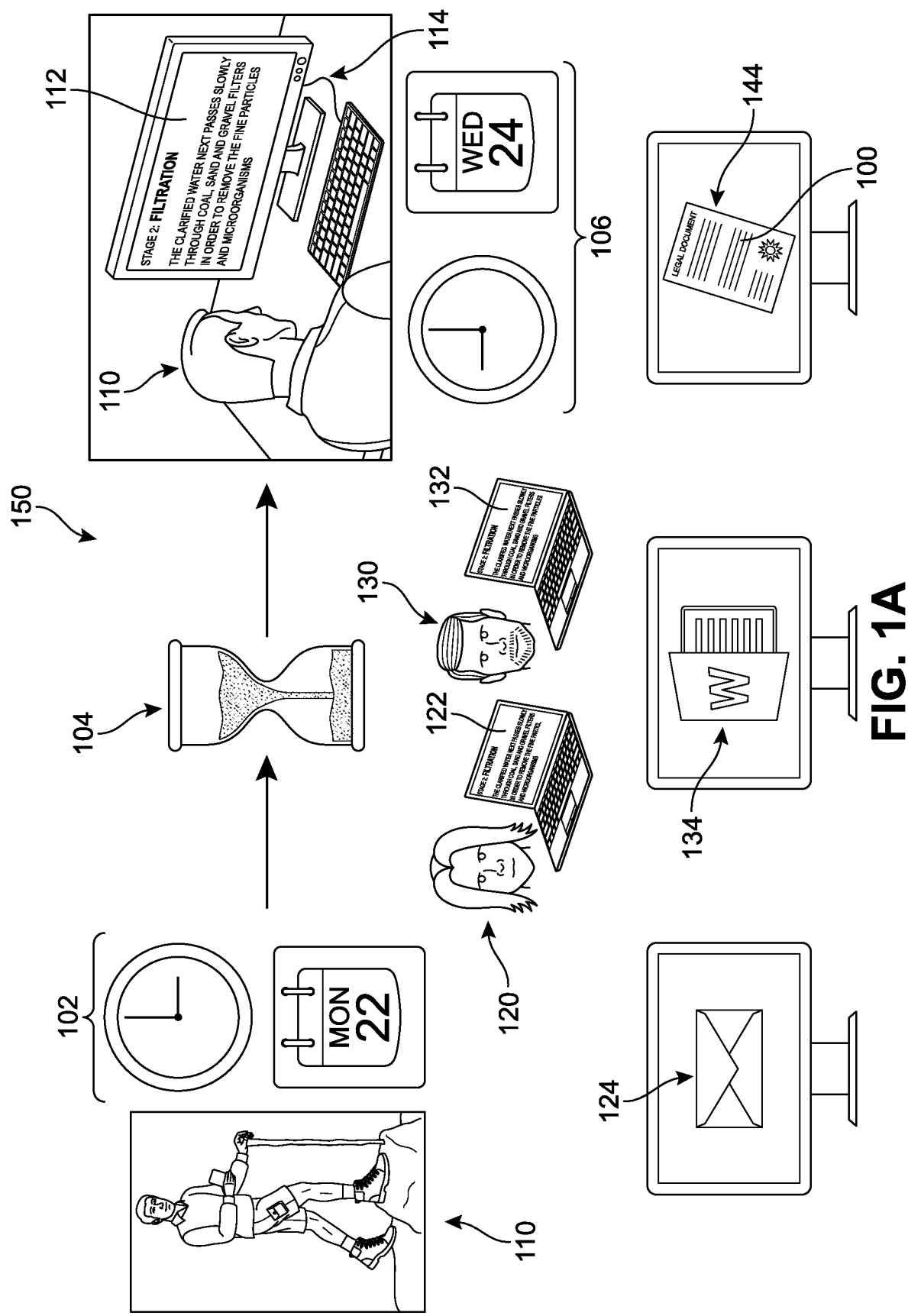

SYSTEM AND METHOD FOR MANAGING NOTIFICATIONS OF DOCUMENT MODIFICATIONS

BACKGROUND

Collaborative authoring and review processes are often used in the development and preparation of different types of documents. For example, many documents generated in today's electronic society are created by one or more individuals, and then can also be subject to further review or edits by other individuals. These collaborative documents are typically created as a form of electronic content that is shared with other co-authors and then forwarded to others for review and revision, perhaps via an electronic network, or shared in real-time via a network. These electronic documents typically contain digital content such as text, images, slides, and spreadsheets. During the creation of a document, content can be subject to revisions over a period of time, often by multiple people. Some document-editing applications—such as word processors, spreadsheet programs, and presentation applications—can also allow users to add comments, suggestions, and/or add and delete content.

Authors and reviewers participating in this shared process typically make changes, such as additions, deletions, edits, comments, markups, or other modifications directly into the file containing the document. In such cases, the individuals involved in the collaborative process may be periodically aware only at a high-level of the changes that have been made to a document, or they may only see changes when comparing a current version of the document with a previous version. Furthermore, particularly in the cases of documents that have been subject to multiple revisions or that rely on the input of a larger group of authors, the ability to readily ascertain or track modifications that have been made to a specific portion of the electronic content can be challenging and at times obscured or unavailable. Thus, there remain significant areas for new and improved ideas for the efficient development of documents, as well as the communication and management of modifications made to different portions of an electronic content item.

SUMMARY

A data processing system, in accordance with a first aspect of this disclosure, includes at least one processor and one or more computer readable media. The computer readable media include instructions which, when executed by the at least one processor, cause the at least one processor to receive, at a first time, a first user input indicating a selection of a first portion of the electronic content item by a first user, the first portion being smaller than an entirety of the electronic content item. In addition, the instructions cause the at least one processor to determine that a first modification event, associated with a second user, occurred for at least a first sub-portion of the first portion prior to the first time, and cause to be displayed, to the first user, in response to determining that the first modification event has occurred and receiving the first user input, a first user interface including a representation of the first modification event. Furthermore, the instructions cause the at least one processor to receive, at a second time subsequent to the first time, a second user input indicating a selection of the first portion of the electronic content item by the first user, and also to determine that a second modification event, associated with a third user, occurred for at least a first sub-portion of the first portion during a period extending between the first time and the second time. The instructions also cause the at least one processor to cause to be displayed, to the first user, in response to determining that the second modification event has occurred and receiving the second user input, a second user interface including a representation of only the second modification event.

A method of presenting information for one or more modification events associated with portions of an electronic content item, in accordance with a second aspect of this disclosure, includes a first step of receiving, at a first time, a first user input indicating a selection of a first portion of the electronic content item by a first user, the first portion being smaller than an entirety of the electronic content item, and a second step of determining that a first modification event, associated with a second user, occurred for at least a first sub-portion of the first portion prior to the first time. A third step includes causing to be displayed, to the first user, in response to determining that the first modification event has occurred and receiving the first user input, a first user interface including a representation of the first modification event. A fourth step includes receiving, at a second time subsequent to the first time, a second user input indicating a selection of the first portion of the electronic content item by the first user, and a fifth step includes determining that a second modification event, associated with a third user, occurred for at least a first sub-portion of the first portion during a period extending between the first time and the second time. Finally, a sixth step includes causing to be displayed, to the first user, in response to determining that the second modification event has occurred and receiving the second user input, a second user interface including a representation of only the second modification event.

A data processing system for presenting information for one or more modification events associated an electronic content item, in accordance with a third aspect of this disclosure, includes at least one processor and one or more computer readable media. The computer readable media include instructions which, when executed by the at least one processor, cause the at least one processor to determine that a modification event, associated with a first user, occurred for at least a portion of the electronic content item. In addition, the instructions cause the at least one processor to determine the modification event is associated with a high likelihood of being relevant to a second user, and then cause to be displayed, to the second user, in response to determining that the modification event has occurred and includes a high likelihood of being relevant to the second user, a first user interface including a representation of the modification event.

A data processing system for notifying a user of changes to specific portions of an electronic content identified as being of relevance to the user, in accordance with a third aspect of this disclosure, includes at least one processor and one or more computer readable media. The computer readable media include instructions which, when executed by the at least one processor, cause the at least one processor to receive an indication of the user accessing an electronic document, and determine that one or more modification events have occurred in connection with the electronic content. In addition, the instructions cause the at least one processor to present to the user, in response to the determination that one or more modification events have occurred, a user interface identifying each portion of the electronic document that is associated with the one or more modification events, where identifying the one or more modification events includes identifying modification events associated with the specific portions in a presentation format that differs from a default format used to identify other modification events.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 1A-1D illustrate an implementation of a document creation and modification environment with a plurality of end-users;

DETAILED DESCRIPTION

Figure 1B:
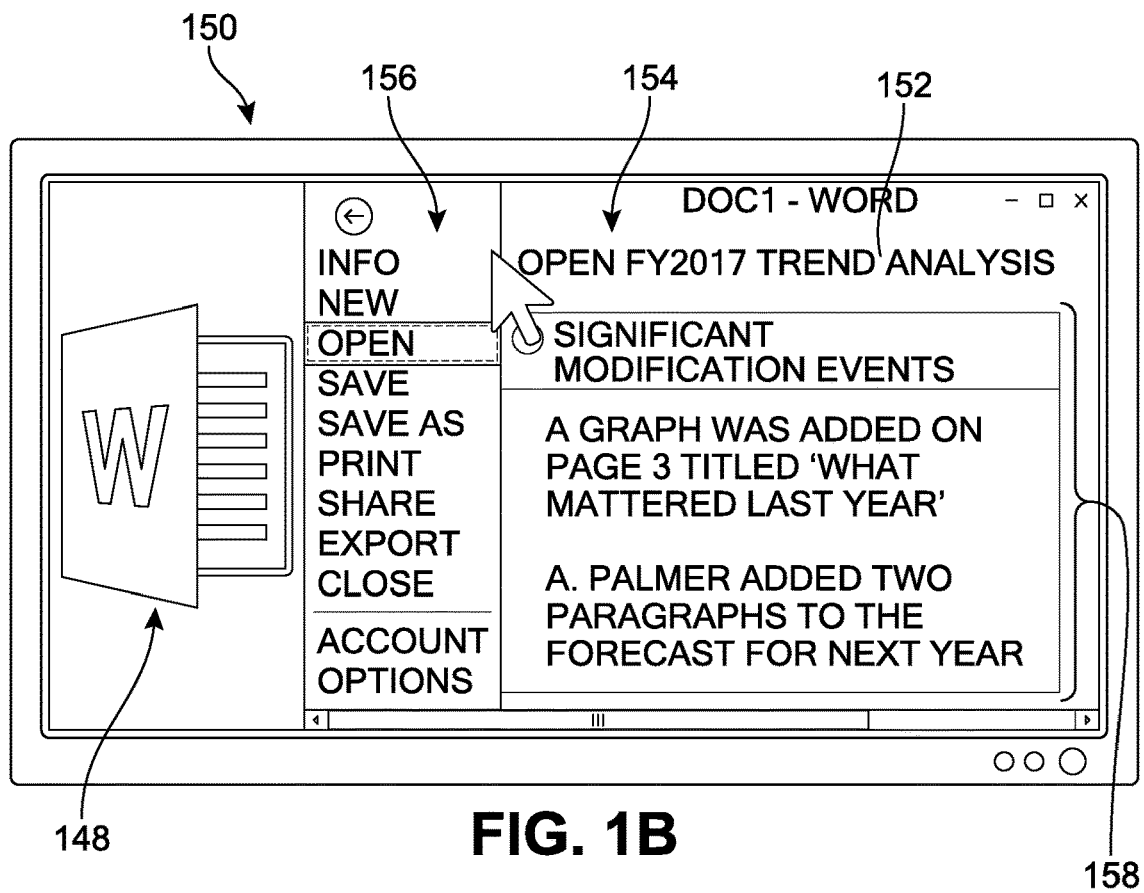

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following implementations introduce a document modification management system and process for facilitating awareness of changes to documents among the collaborators or readers of the document. The identification and presentation of these modification events can provide a more precise understanding of which portions of an electronic content item have been the subject of edits or review, as well as assist users in remaining abreast of revisions during the production of the document. In addition, such a tool can allow the collaborative group as a whole to remain cognizant or 'on the same page' with respect to the additions, deletions, comments, or other modifications by individual members of the group and quickly assimilate or become familiar with updates to the document. In particular, implementations of the disclosed systems can offer users a straightforward process by which to more efficiently identify changes that are of particular significance to them. As an example, the system may periodically provide a user with a list of recent modifications that have occurred, expediting a user's ability to comprehend the modification events in their broader context. These lists can in some implementations benefit from the application of natural language processors in communicating the changes to users. In another example, a reader can access a document and target and select a portion of content within the larger document that directly interests them and view the changes that have occurred to only that portion. This can decrease the time that would otherwise be expended in navigating among the numerous layers of modifications that have been made throughout the entire document. For example, the presentation of the more relevant modifications can be configured to facilitate an improved user insight and knowledge regarding the specific portions that are important to them. This lessens the burden of time and mental energy of users who traditionally identified these modifications by comparison of different versions of a document, or a cumbersome navigation through changes that do not impact them to find the one that does. In addition, users can more readily work out when a specific piece of content evolved into its current form. Such tools can provide collaborative document users and readers the ability to more clearly distinguish between changes that do not affect them or that are irrelevant in their sphere of interest from those changes that involve portions of the document that are subject to greater attention by the user.

As introduced above, applications such as word processors, publishers, spreadsheets, presentation software, and others can be used to generate electronic documents or content. In general, the term "electronic content" or "document" includes any digital data that may be presented (e.g., visually or audibly presented), including but not limited to an electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI, and other digital data. As an example, this electronic content may include spreadsheets, presentations, or other digital-based media.

Furthermore, within some types of documents, the electronic content can be understood to include elements that will be referred to as content portions, or more simply, portions. A "content portion" can be understood to include any part of electronic content that is defined or discernable as a part. For example, a content portion may be automatically discerned from a characteristic of the content portion itself (e.g., a letter, number, word, sentence, paragraph, section, image, symbol, or chapter of an electronic document, or other file format designation) or may be manually defined by a reviewer or end-user (e.g., selected collection of words in an electronic document, a selected portion of a digital image, a selected group of cells in a spreadsheet, a selected region in a slide from a presentation). Examples of content portions include portions or pieces of electronic text or other material within an electronic document, comments, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by reviewers within electronic content, including instances of scripted and non-scripted dynamic content and the like.

Furthermore, a user can be understood to be a person who creates, authors, views, develops, manages, collaborates, suggests, guides, outlines, restructures, formats, modifies, reviews, brainstorms, revises, or deletes pieces of electronic content, including the creation, viewing, or updating of comments associated with the electronic content. A contributor includes a user of electronic content based application programs, as well as a user of the apparatus and systems described herein. Furthermore, the term "software application", "software", or "application" generally refers to a computer program that performs useful work, generally unrelated to the computer itself. Some non-limiting examples of software applications include word processors, spreadsheets, slideshows, presentation design applications, accounting systems, and telecommunication programs, as well as gaming software, utility and productivity tools, mobile applications, presentation graphics, and other productivity software.

Once a change is made to a shared document, the change may be stored in the document and/or be made available for viewing in a substantially real-time manner to other users. Such 'instantaneous' or substantially real-time modifications and revisions can be used to facilitate collaborative workflows, but can also present challenges for users as they endeavor to maintain an up-to-date awareness of the status of content portions in the document. It should be understood that electronic content (also referred to interchangeably as 'document(s)' throughout this application) being developed collaboratively include any activity in which multiple machines operate together autonomously, or as directed by humans, to process information, including electronic content. Processing the information may include the activities of acquiring the information, augmenting the information (e.g., via the addition of meta-data, such as comments), sorting the information, changing the information, deleting the information, rendering the information, aggregating the information from multiple sources, transforming the information from one form to another, and deriving new information from previously-existing information. One example of a collaborative process is the cooperation of multiple authors to draft content and reviewers to view, comment on, and make changes to a document as part of a shared review activity.

In scenarios where multiple contributors (e.g., authors and/or reviewers) are collaborating to produce a document, various parts of the document may be authored and/or revised at different times or during different stages of document development. For example, a first portion of the document may be finalized, a second portion of the same document may be in the midst of revisions, and a third portion within the same document may be in an initial drafting stage. Thus, document growth and development can vary across various portions of the document. Initially, a document may appear to be primarily focused on details for one section, and at a later time, other sections may be added. It may not be often clear or easy for a user to follow and appreciate the extent or type of modifications that have occurred for specific portions of content. In addition, a reader accessing a document may inadvertently assume that the portions of the document that are of relevance are in a different state of revision or state than has actually occurred. In some cases, readers may be required to remember to track changes and comments on their own in order to determine whether a content element or content sub-portion was added to a section of the document that mattered to them. These reviews are both time-consuming and can lead to inconsistent or inaccurate assessments of content modification status, reducing efficiency of the development of a document, as well as diminishing a user's ability to respond in a timely manner to changes that warrant their attention.

As a reader manages their day-to-day access of various documents, they may be inundated with many different notifications, alerts, messages, or other communications that can obscure or 'bury' awareness of the events that matter to the reader or that would be otherwise prioritized. The risk of missing an important event or modification is increased as the user attempts to monitor the influx of information about their documents after time "away", such as changes to the document that occur after leaving work for the day and before returning to work the next day, as well as weekends, periods of travel, vacation, holidays, or sick leave.

As will be described below, the proposed system provides both individual and group users the ability to more precisely and/or meaningfully communicate and appreciate electronic content changes, providing readers and contributors with a more comprehensive and intuitive sense of the document development process. This in turn can improve the management of electronic documents and facilitate a more natural and effective workflow. These systems and methods can reduce the demands on members of a collaborative document team, which can help foster working relationships between users as well as increase quality of the end-product.

In order to better introduce the systems and methods to the reader, FIGS. 1A-1D presents an example of a representative document modification processing environment ("environment") 150 for implementing a content contribution management system (illustrated schematically in FIGS. 2-5). In different implementations, the environment can include a plurality of computing device users, also referred to here as users or collaborators. For example, a first user 110, a second user 120, and a third user 130 are depicted in FIG. 1A. One or more users can interact with or manipulate data presented via a user device. In this case, each user is accessing a document 100 on separate computing devices that are linked via a network connected to the device's local data repositories. As the users collaborate on a shared document, various pieces or segments of the document may be modified or otherwise accessed at various times and across various devices. In one implementation, multiple users can access the same document at the same time and make changes that are presented in real-time or at a later time to other users. Thus, workflow occurs via multiple 'streams' that are configured to push data and pull data from the central repository or cloud network. The document 100, while illustrated here as a word processing file, can include any type of digital media file, as described above.

In this example, the first user 110 for purposes of simplicity may be a manager of the collaborative group and/or document 100 who 'checks in' to the progress of the document periodically. In other implementations, the first user 110 may be any other type of accessor of the document, including an editor, reviewer, or reader. The first user 110 may be linked to the document as an owner or the administrator for the document, and may have originally created the document, or suggested a template. For purposes of this example, the first user 110 is shown as having accessed the document 100 at a first time 102 (illustrated schematically by a clock and calendar), here during a personal recreational activity). At the same or during some subsequent period of time 104, the second user 120 and the third user 130 can be adding to or otherwise interacting with and/or modifying one or more portions of document 100. In other words, the second user 120 views/modifies a first portion 122 of the document and the third user 130 views/modifies a second portion 132 of the document during a period of time extending between the first time 102 and a second time 104 (illustrated by another clock and calendar). The first portion 122 and the second portion 132 can differ or be the same in different implementations.

As will be described in further detail below, in different implementations, one or more users can modify different portions over time and contribute to the evolution and development of a document. Thus, a document may undergo a wide range of changes at any time during the lifecycle of the document production. As the document 100 is created and modified by different contributors via a network or cloud-based collaborative application, there may be periodic or real-time updates to the status of various portions of the document. Those accessing the document can in some implementations view some or all of these modifications as applicable to specific portions of content, facilitating an awareness of relevant portions of the document's evolution over time. After period of time 104, the first user 110 may return to the document 100 at a second time 106 (shown here reviewing a third portion 112 of the document 100 at their desktop 114). At this second access point that is subsequent to the previous (first) access point, the first user 110 can open and view the most recent version of the document 100, as it has been revised or modified since the first access point. However, particularly in cases where the period of time 104 is extensive, the document 100 is large, there are many collaborators, the modifications are extensive, and/or the second user 120 and the third user 130 have made a great many changes, the first user 110 may find it is difficult to 'catch-up' or appreciate the range of changes made to the portions of the document that matter to them, or how and why the document has developed as it has, aspects that can be very important for collaborators and can reduce or minimize the exchange of redundant efforts or ideas.

In different implementations, the systems described herein can offer users a wide array of notification types or progress reports identifying modifications made to a document. In FIG. 1A, some examples are represented, including an e-mail digest 124 listing the changes (see FIG. 1C), a message 134 that is conveyed to the user upon their access of the client application used to develop or view the document 100 after a period of time (see FIG. 1B), and an indicator 116 displayed while the document 100 is opened (see FIG. 1D). Throughout the description, the term "indicator" may be used interchangeably with the term "representation".

When a user accesses a client application 148, they may be able to view documents, information about the documents, and/or options or tools that can be used in association with the document or application. Referring to FIG. 1B, a simplified view of an implementation of a display 150 is presented in conjunction with the user access of a first electronic content item ("first content") 152, identified in this case by a file name "FY2017 Trends Analysis". The file name is presented within a first document properties interface ("first interface") 154 of the application that is included in the display window. In some implementations, the first interface 154 can be positioned or located adjacent or proximate to a second region, herein referred to as a main menu interface 156, or may extend outward from the main menu interface 156. The main menu interface 156 can be configured to display or present various options by which a user may navigate through the application and/or any stored or currently accessed documents. For example, in FIG. 1B, a user may choose to print, save, share, close, etc. the application and/or currently accessed document via the main menu interface 156.

As noted earlier, the system can include provisions for notifying or communicating to a user various modifications that have been made to a document. A second user interface ("second interface") 158, labeled here as "Significant Modification Events" is one type of such a notification. In one implementation, modification events can be shown in order of their degree of relevance for the user as determined by the system, which will be discussed in further detail below. In other implementations, the list may be shown in order of the modification's occurrence in the document or the date it was added. In some other implementations, there may instead be a listing of the documents that have been determined as most relevant to the current user, and/or a more simplified notification as to whether any of these documents have been edited since last accessed.

It should also be understood that while various examples presented herein identify changes made to documents as a whole, the same systems and methods can be applied to smaller portions of a single document. In different implementations, one or more of a section, chapter, slide, page, graph, table, image, formatting, paragraph, sentence, word, footnotes, title, table of contents, or other selected portion or aspect of content in the document can be demarcated or singled out for purposes of identifying any associated modification events, rather than presenting each modification event across the whole document. This focused presentation of modifications can occur automatically, where a first user may view modification events for only some portions of a document by intentionally isolating and/or selecting those portions, and/or where the system automatically determines which portion(s) are of greatest relevance to the user and limits the presentation of the modification events to those (and/or differentiates them in appearance to the user). These features will be discussed further below with reference to FIGS. 2-5 below.

Figure 1C:
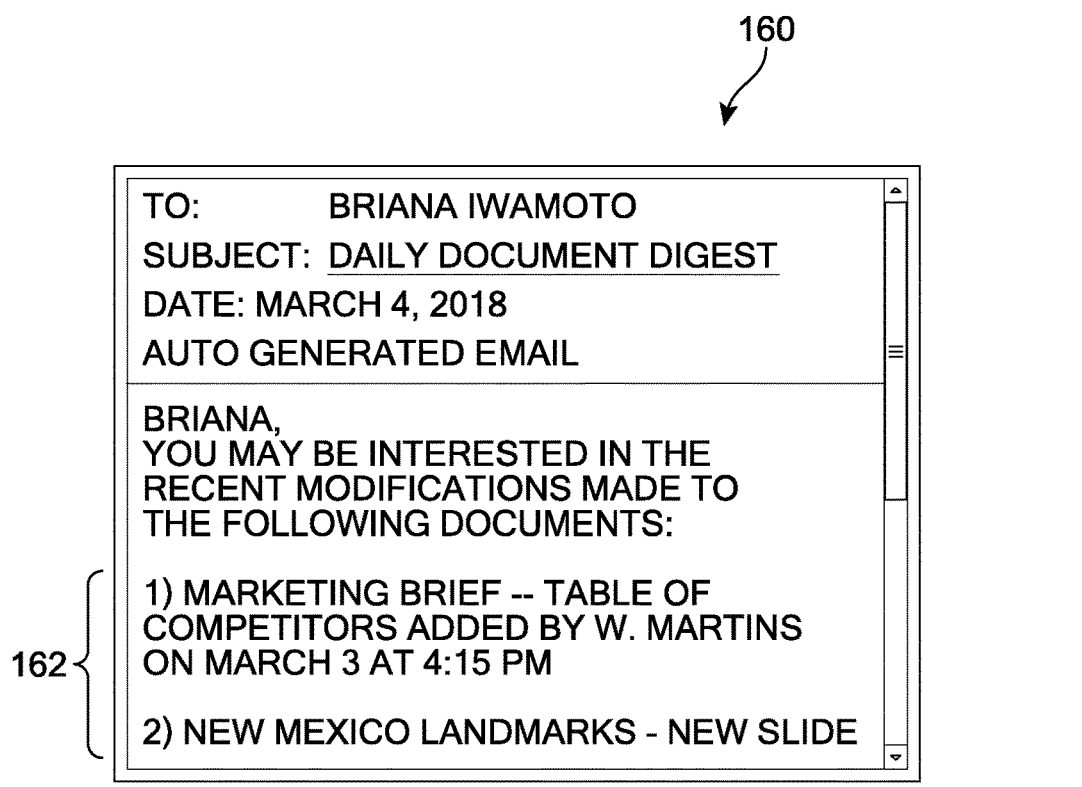

With reference now to FIG. 1C, in another implementation, modification events may be presented by other communication means, including but not limited to an automatically generated e-mail, instant message, chat message, pop-up window, text message, or other automated message. An email notification 160 is shown in FIG. 1C that presents a list 162 of some modification events that were determined to be of relevance to the receiving user. In some implementations, this email or other message can convey the changes in natural language, rather than as a recitation of data, as will be discussed further below (see FIG. 9).

Figure 1D:
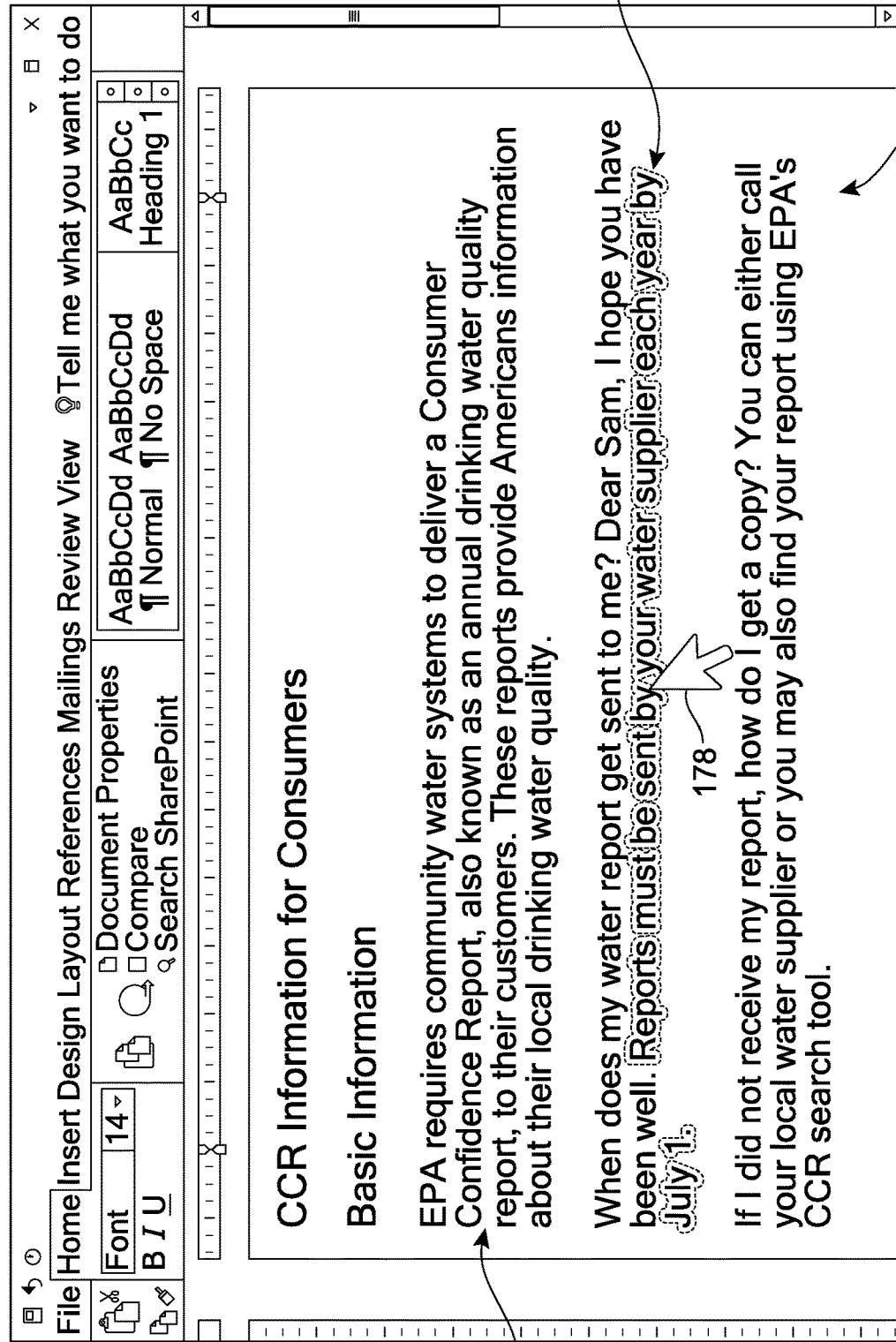

In some implementations, as shown next in FIG. 1D, a user may access a document and wish to swiftly understand or view changes that are relevant to their needs or usage of the document. In other words, there are often times when a user wants only to become familiar with changes made to specific portions of content in the document. In some implementations, the system can provide a mechanism for providing information in response to a particular user input. For example, such an input may include movement of the cursor in close proximity to or over the specific portion, such as a mouseover event or an occurrence of the mouse cursor being moved over (hovering) a target element.

In FIG. 1D, a client application 170 includes a display interface 172 presenting a document 174. In response to a user mouseover event 178 in this case, an indicator (represented by a text highlighting) distinguishes the information that has been revised or added in connection with a target element 176, which has two sentences. In this case, the target element 176 now includes the sentence "Reports must be sent by your water supplier each year by July 1" (see highlighted text), and a user can quickly see what change was made to the selected portion. Additional details regarding this type of notification will be provided below. In other implementations, any other types of interactions with a target element or content portion can include touchscreen gestures, hand gestures, mouse clicks, highlighting, keyboard commands, virtual commands, or any other instructions or combinations thereof.

Figure 2:
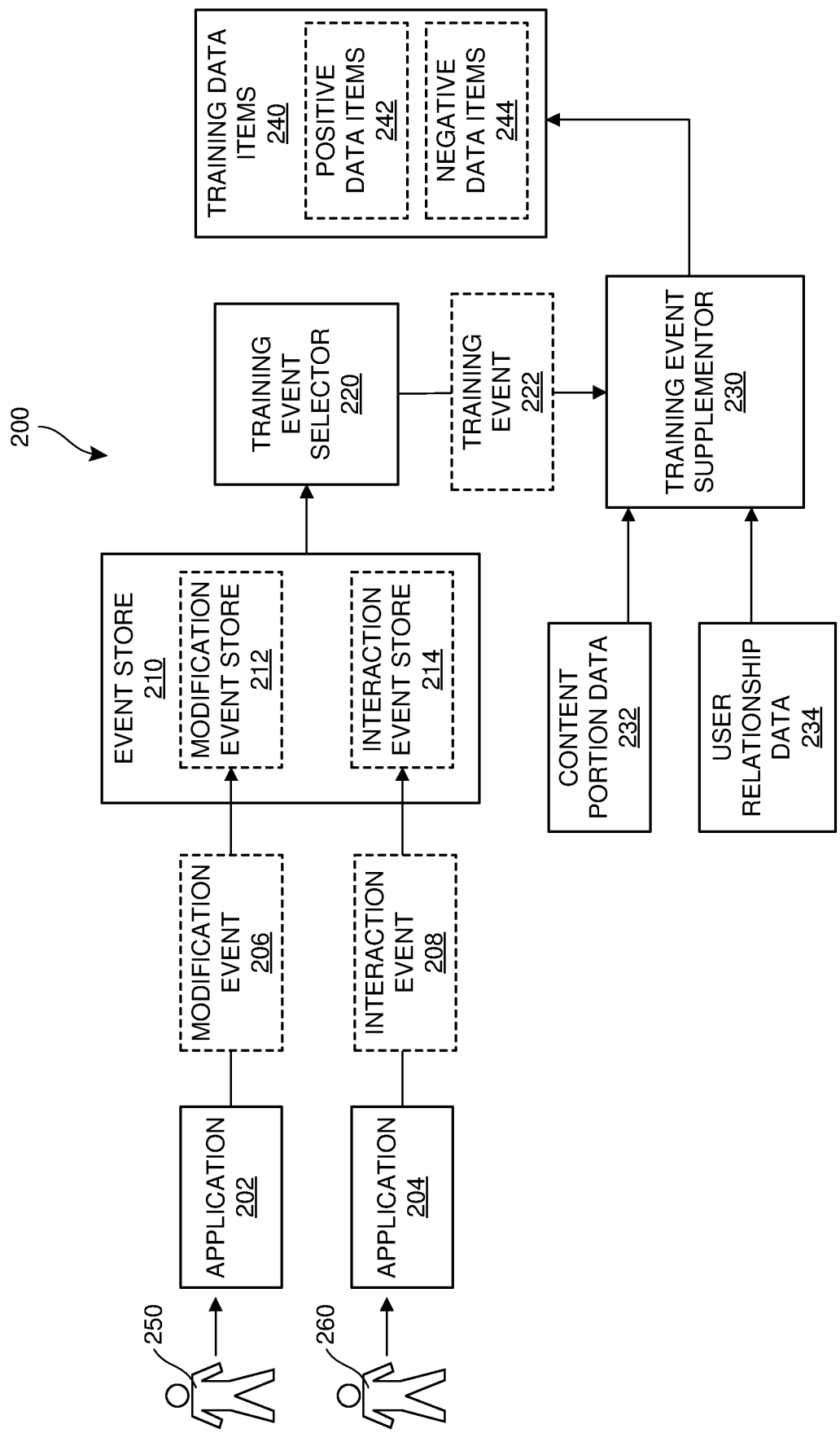
FIGS. 2 and 3 are a system diagram illustrating an implementation of a training system for a machine learning model configured to determine relevance of a modification event.
Figure 3:
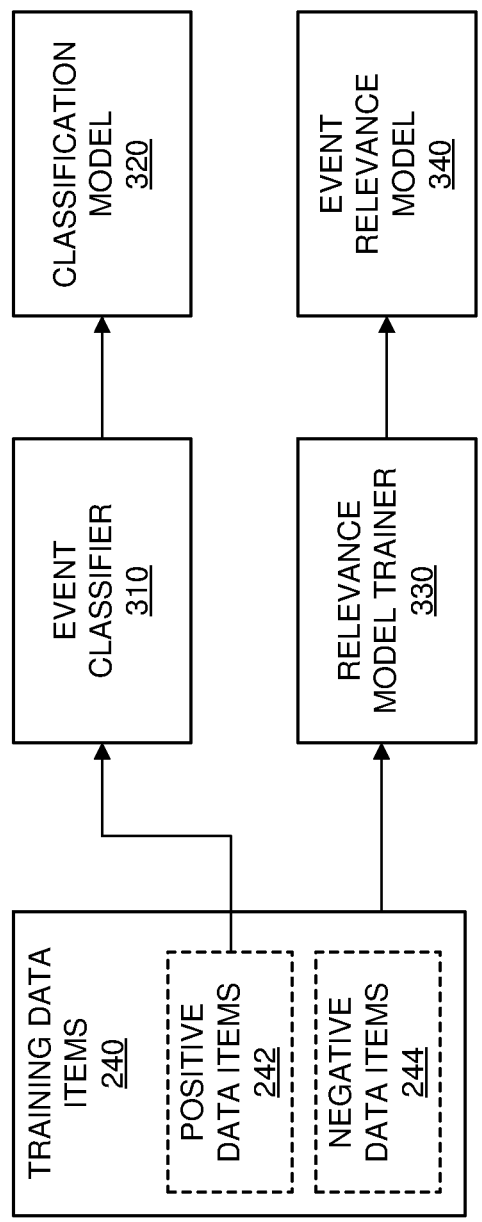
Figure 4:
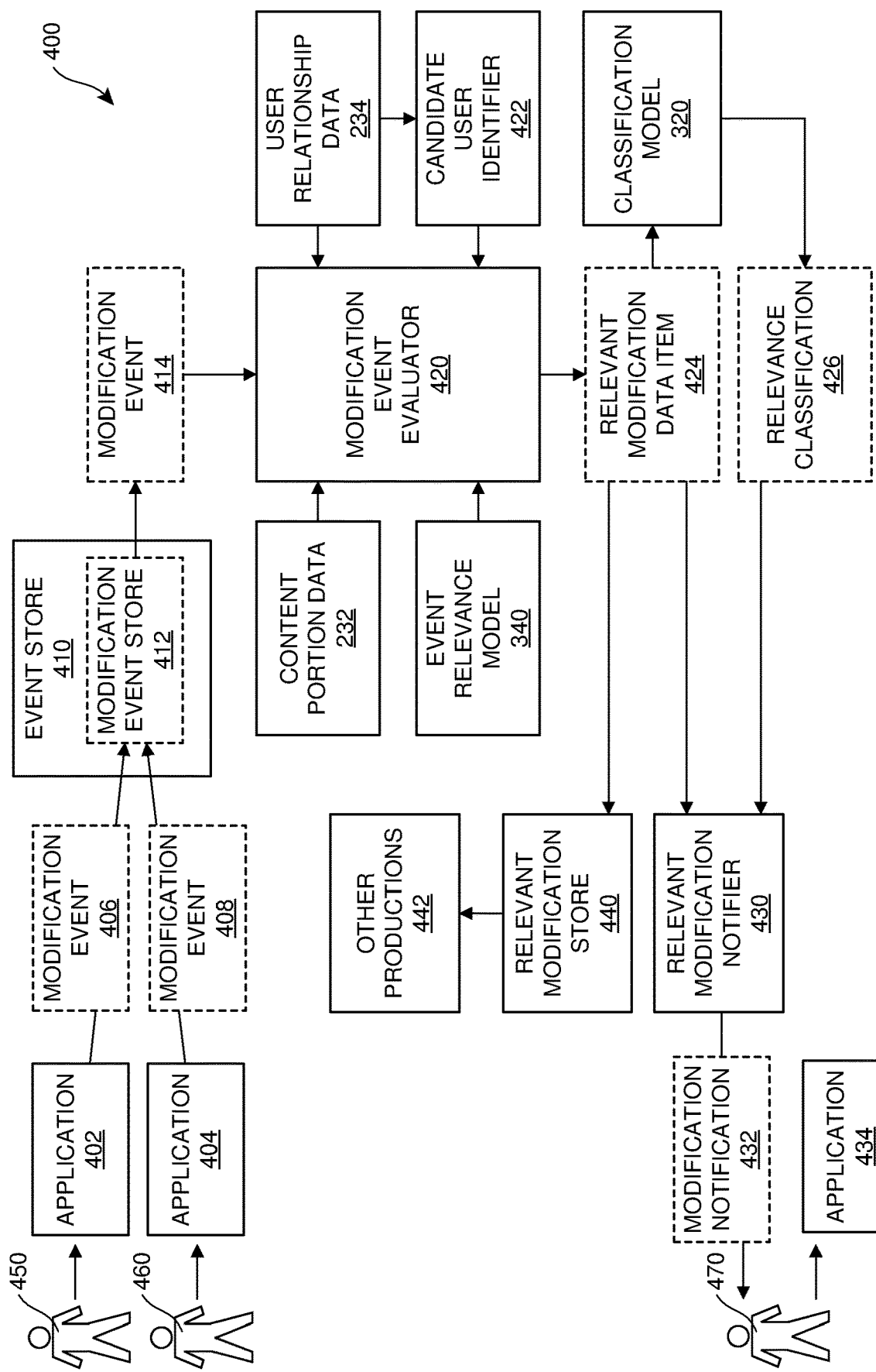
FIG. 4 is a system diagram illustrating an implementation of determining relevance of a modification event and providing user notifications of the modification event.

Referring now to FIGS. 2-4, some examples of a representative architecture for a content modification management system ("system") are depicted. In different implementations, the proposed systems include provisions for accessing different stores of information in order to identify events associated with a high likelihood of being relevant to a user and/or presenting various user interfaces for sharing this information. In some implementations, the process of determining the relevance of a modification event can be based on a wide range of factors. In FIG. 2, an example of a first system architecture ("first system") 200 that is configured to 'learn' whether a specific document, modification event, and/or content portion has a high likelihood of being relevant to a user is illustrated.

As a general matter, the systems described herein may include, or otherwise make use of, a machine-trained model to determine if the modification includes a high likelihood of being relevant to a user. As an example, a system can be trained using data generated by machine learning (ML) model in order to identify, determine, and/or assess the significance associated with an edit made to a content portion. Such data may be generated following the accumulation, review, and/or analysis of a large number of edit-related events or actions, as well as other user interactions with documents, that may be configured to provide the ML algorithm (MLA) with an initial or ongoing training set, including recorded use or behavior of application features by different users over time (content usage history). As a general example, a number of events used to serve as a baseline for training can range from 100 to over 1,000,000. In addition, in some implementations, a user device can be configured to transmit data captured locally during use of the relevant application(s) to the cloud or the local ML program and provide supplemental training data that can serve to fine-tune or increase the effectiveness of the MLA. The supplemental data can also be used to facilitate identification of relevant modification events for a particular (unique) user or class of users and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, a size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

In some implementations, the ML models and/or their corresponding classification systems can be configured to use, among other things, machine learning and inference techniques to identify and/or classify modification events or user behavior based on data collected during use of the system. In some implementations, machine learning techniques may generate one or more models for identifying and/or characterizing events based on a corpus of training data in the form of labeled or otherwise previously characterized data. Furthermore, the training data may be continually updated and one or more of the models used by the classification system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

Thus, in different implementations, a machine learning model can be developed that is configured to predict with high confidence, precision, and recall whether a modification event is likely to be of relevance to a specific user. The ML model can then be applied to provide a user experience that guides the user to view the edited content or pursue other edit management options if the model's prediction was correct. In some implementations, the ML model can obtain reinforcement signals to improve the model and better account for user intentions regarding an edit. As a preliminary modeling paradigm, some implementations can make use of one or more bootstrapping algorithms to provide approximations of these predictions. For example, in one implementation, the model can assume all edits made to a particular document are relevant to a user as a proxy. In some implementations, the resulting (initial) model of this example can be configured to predict whether an edit is relevant to a user with 80% or greater precision. In some implementations, if the model determines that the user will not be interested in any of the modification events in a file, a user may receive few if any messages about the events, and be required to more proactively interact with the application in order to view any modifications, with such interactions (in some implementations) being recognized for identifying new training data items that improve the effectiveness of the model.

The first system 200 of FIG. 2 offers one example of an initial model training paradigm. In different implementations, an initial model can serve as a baseline that facilitates the collection of additional and/or more relevant training data, permitting further development and improvement of the model. Generally, the stages of an interaction event (which encompasses a modification event) can include opening or otherwise accessing electronic content, viewing or scrolling through specific pieces of content, clicking or repositioning the location of the cursor (e.g., via a mouse) within the content, entering, deleting, or changing text or any other data in specific sections of the electronic content, highlighting or selecting a portion of the electronic document, interacting with menu options associated with edits, and/or manipulating the data in any other manner. Each of these aspects can be divided and classified into discrete events that may be identified individually or collectively as an interaction event, which can in some implementations elicit the presentation of a native control, such as a graphical UI, or GUI.

In FIG. 2, a first end-user 250 and a second end-user 260 are depicted. For purposes of simplicity, the first end-user 250 can be understood to be a modifier of a content portion in this example, and the second end-user 260 is a candidate receiver or reviewer of the content portion (i.e., who would be a potential recipient of the modification notification). The first end-user 250 can access various electronic content portions via an application 202 available through a first device and/or a cloud network connection. In some implementations, during their access of an electronic content, one or more content portions can be modified by the first end-user 250, which are each identified as a modification event 206. The modification event 206 can be conveyed or received by a storage or event store 210. Over previous, simultaneous, or subsequent periods of time, the second-end user 260 can also be recorded as accessing the same electronic content via application 204. The accessing of the document itself is a type of interaction event.

As a general matter, an "interaction event" as used herein refers to an event (or specific sequence of events) associated with a particular use or access of an electronic content, which may then be used to determine whether the content is relevant to a user. In other words, interaction events can offer opportunities for identifying training data reflecting key signals that can be used to evaluate how likely a user would wish to become aware of a collaborative action (e.g., a modification). Such signals allow the model to determine whether (and to what degree) a portion of electronic content is relevant to a specific user.

Referring back to FIG. 2, each interaction event that occurs for a document, as well as corresponding modification events, including any associated metadata and contextual information, can be stored in the event store 210. This information can be provided to or received by a training event selector module 220, which may begin to evaluate whether a document that has undergone a modification event 206 is also of relevance to the second end-user 260. If any interaction event 208 is recorded for a content portion, in combination with one or more modification events for that content portion, may be taken or interpreted as a training event 222. The occurrence of a training event 222 and associated information about the training event can be transmitted to or received by a training event supplementor 230.

In different implementations, the training event supplementor 230 can also be configured to receive one or more key signals associated with a content item and/or end-users, including but not limited to content portion data 232 and user relationship data 234. As noted earlier, a range of key signals can be used to determine whether a modification to a particular content portion is important to a user. In different implementations, it can be understood that such key signals can include, but are not limited to (1) a scope of the content portion that is (or was) collaborated on; (2) a location (folder or site or project) of the content portion; (3) the document(s) saved in a target location; (4) specific content types in an electronic content; (5) a user's relationship to a portion of content (e.g., for this specific content element, does/did the user (a) have manager rights, (b) create it, (c) manipulate or otherwise use this content previously, (d) edit or share this content, (e) chat about it, (0 save a copy of it, (g) attach it to an email, or (h) taken some other explicit action involving this content; (6) content portion is related to a document the user cares about or a project the user has shown interest in (e.g., content was created, a new document in a related project is generated, new or different content in a relevant document is added or deleted, a relevant document is deleted, any changes made (particularly the magnitude of the change, extending from small changes within a document, larger changes within a document, changes across many related and relevant documents), as well as (7) a type of modification (content, formatting, styling, new comments, replies to comments, track changes, etc.). In another example, the system may detect that a user has a pattern or history of authoring content related to a specific topic. In such cases, if there is content in another file about that topic, and that content has been updated or otherwise modified, the system can be trained to notify the user of such changes. These types of key signals can be categorized as content object data 232.

In addition, in some implementations, the model can be configured to take into account aspects beyond the key signals that are associated with the electronic content itself. For example, other key signals can correspond to the identity of the modifying user ("modifier") and their relationship to the user may also impact the determination of relevance. In other words, the identity of the user who modified the document can affect the determination of whether that modification is relevant to another user. For example, if the modifier is someone the user communicates with regularly, or has recently been in touch with, someone the user has identified as being important or wishes to follow, someone who is part of the user's network, or has a specific role relative to that of the user (such as, but not limited to, a manager or other member of the same organization), the changes made by that modifier can be relevant. As another example, if the system detects a pattern of communication or interactions between the user and the modifier (e.g., exchanges over emails, chats, and/or meetings) that indicate a degree of connection or a particular relationship, the system can be trained to identify changes made by the modifier to a document as being of relevance to the user. These types of key signals can be characterized as user relationship data 234.

It should be understood that in some implementations, the models can further be configured to determine the relative significance or relevance of a content portion or document over time. In other words, a user may not have any connection to a document initially, but over time the relevance of the document increases until a threshold is reached and any modification events become important to the user. Similarly, the degree of relevance can decrease over time, resulting in the user being notified of fewer and fewer modification events for that document.

Thus, the training event supplementor 230 can receive information that provides additional context about the modification event(s) and interaction event(s) and determine whether a modification event should be classified as being of relevance to the second end-user 260 and included in a resulting training data items. These training data items 240 are thereby grouped into items that are potentially relevant (positive data items 242) and items that are likely of little or no relevance (negative data items 244).

Referring to a continuation of first system 200 in FIG. 3, the training data items 240 can be utilized to improve the performance of the models. For example, positive data items 242, which represent items that have been categorized as relevant, can be transmitted or collected by an optional event classifier 310, in order to guide and generate an optional classification model 320 that can automatically determine what type of event this will be classified as. In different implementations, this information can be used to provide context or reasons for why certain events are relevant.

In addition, the training data items 240 can be conveyed to a relevance model trainer 330 (thereby receiving both positive data items 242 and negative data items 244) which can be configured to generate an event relevance model 340. In some implementations, the training can occur based solely or primarily on positive data items, and in other implementations, both negative and positive data items can be used. The event relevance model 340 can then output an indication of the relevance to a particular user, for example a confidence value falling between 0 and 1. In different implementations, a threshold confidence value can be set or selected by a user in order to identify events that should be considered relevant.

A second system architecture ("second system") 400 is presented in FIG. 4 configured to make use of various trained ML models, including those models described above. In different implementations, the second system 400 can be configured to present user interfaces for identifying and classifying modification events. It can be understood that the second system 400 presented here is merely an example implementation and that a wide variety of other implementations are possible.

In different implementations, the second system 400 can include one or more end-user systems, as represented by a first end-user 450 and a second end-user 460, each of whom may be making modifications to documents. The end-user systems can each include a display device used in connection with an application 404 to display graphical elements generated by a user interface to the first end-user 450 and an application 408 to display graphical elements generated by a user interface to the second end-user 460. In addition, the end-user systems may include one or more input devices used to receive commands or other input from a user, from which the end-user system is configured to generate corresponding user input for the application. Each of the users of the applications may be associated with different user identifiers, such as usernames and/or numbers.

In some implementations, the user interfaces included in the application 406 and application 408 generate various graphical user interfaces for viewing and editing a current electronic content ("document"). In some examples, the current electronic content can be from an electronic content repository. As described in this disclosure, each end-user may be associated with a modification event. In FIG. 4, the first end-user 450 has caused or been otherwise associated with a first modification event 406, and the second end-user 460 has caused or been otherwise associated with a second modification event 408.

Each modification event can be recorded and conveyed to an event store 410, and saved in a modification event store 412. One or more of the modification events 414 captured or collected by the modification event store 412 can then be sent to a modification event evaluator 420. The modification event evaluator 420 is configured to receive an array of information, including content object data 232 (see FIG. 2), data generated by the event relevance model 340 (see FIG. 3), and/or user relationship data 234 (see FIG. 2) which can help filter the low-relevance modification events from the high-relevance modification events. It can be appreciated that the relevance outcome is dependent on the identity of the potential receiver or candidate for the modification notification. Thus, the modification event evaluator 420 can also receive one or more candidate user identifiers 422 along with the event details in order to determine with specificity the relevance of the event for a particular (unique) candidate user.

The modification event evaluator 420 can then yield an assessment of the likelihood of relevance of the event to a specific candidate as a relevant modification data item 424. In some implementations, a relevant modification notifier 430 can be configured to receive an indication that an event was relevant via the transmission of the relevant modification data item 424. The relevant modification notifier 430, upon receipt of the relevant modification data item 424, can further be configured to generate and transmit a modification notification 432 to a third end-user 470 for whom the modification event was deemed to be of particular relevance. In response, the third end-user 470 can access the content and information related to the modification via an application 434.

Furthermore, as noted earlier, in some implementations, the systems can optionally make use of classification model 320, which can receive and process the relevant modification data items and submit them for classification via a relevance classification module 426. Similarly, in different implementations, the relevant modification data items can be optionally sent to a relevant modification store 440 for recordation and storage. The information can be used to improve communications between the system and the user and/or between users, as well as other productions that can use such data in a step 442.

In different implementations, the system may also be configured to ask or present a query to the user regarding whether an edit determined to be relevant was correctly identified. The feedback provided by the user can then reinforce or retrain the model. For example, if the user responds that the determination was correct, the model can be reinforced, and if the user responds that the determination was not correct, the model can be updated or retrained. Furthermore, it can be understood that there will be cases where users will ignore or dismiss any notifications, and no feedback will be provided. In this situation, the user's subsequent actions can nevertheless be informative for training the model. As an example, if the system predicts that a modification event was relevant, and the user dismisses the document, the user may still return to the document at a subsequent time and review the modification event that had been specifically communicated. Such behavior can indicate to the system that its prediction was correct, which can be used to re-enforce the model. Alternatively, a user may ignore the notification and not return to the document, suggesting that the prediction was incorrect, and this information can also be used to retrain the model.

FIGS. 2-4 describe some possibilities by which a system may automatically determine which document (or portion(s) thereof) are of relevance to a user. However, it should be understood that in other implementations, a system may provide an interface by which the user can alternatively or additionally input or select the documents (or portion(s) thereof) that they would like to be notified about. In other words, users can directly request that modifications to specific portions or documents that the user has identified by name, category, grouping, authorship, or other classification, should trigger a notification to the user. Thus, in some implementations, users can hard code the documents or portions of the document that are relevant so the system presents information in accordance with the user's instructions, rather than (or in addition to) the models described above. In different implementations, a user can manually select portions of electronic content (e.g., words, sentences, paragraphs, tables, images, graphic, etc.), and/or files in a folder, attachments in an email, documents listed as being authored by particular author(s), documents produced by a specific team or organization, documents that include particular words in the file name or title, any documents that undergo changes over a specific period of time, documents of a particular file extension type (e.g., .ppt, .exl, .wps, .doc, etc.).

Figure 5:
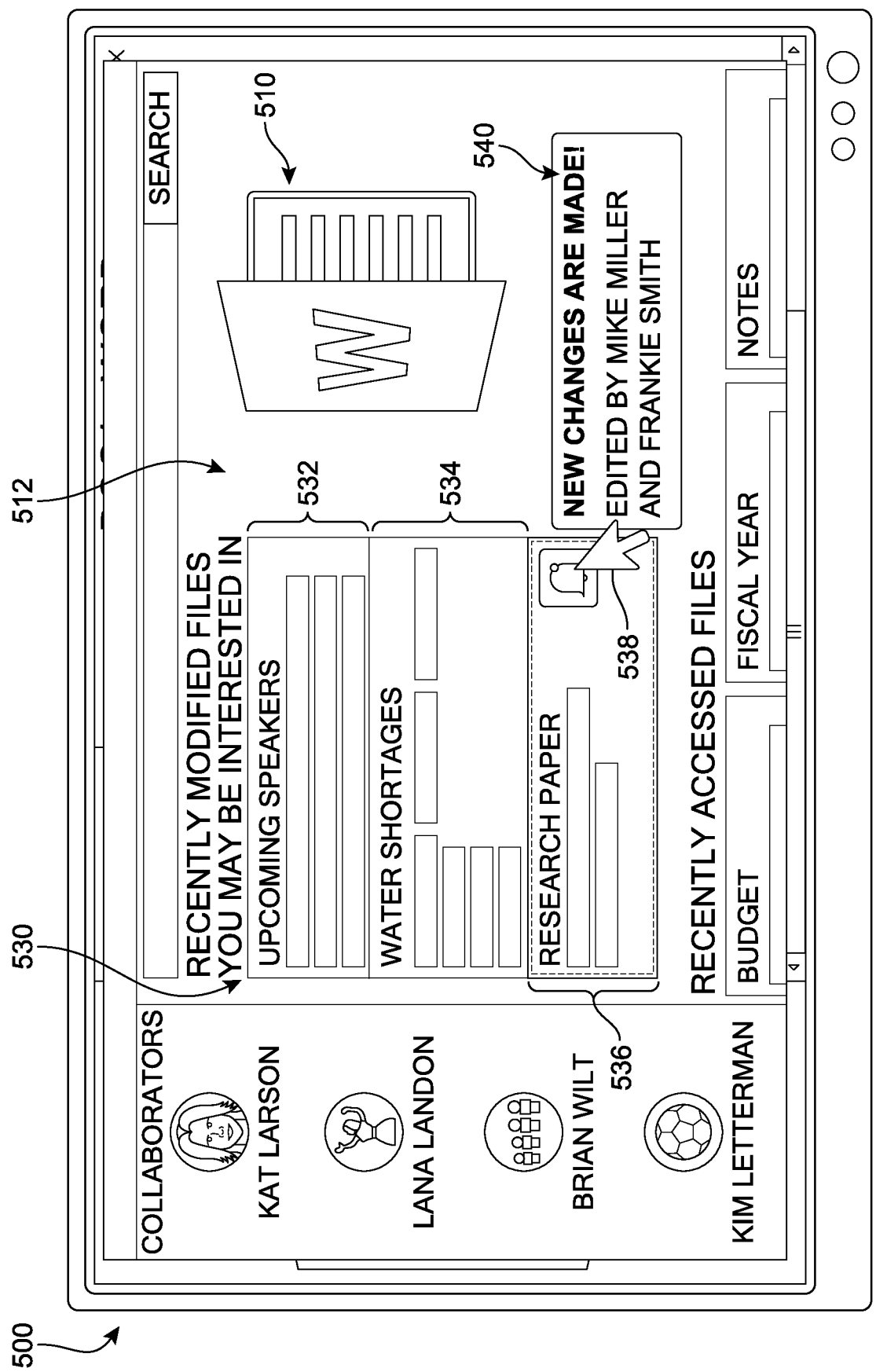
FIG. 5 is a computing display illustrating an implementation of a document processing application with a listing of recently modified files.

For purpose of clarity for the reader, FIGS. 5-8 present some examples of user interfaces by which modification notifications may be presented. In FIG. 5, one implementation of a modification event notification feature or mechanism is depicted with reference to a display 500 for a computing device. In different implementations, the display 500 may be configured to present various icons, interfaces, graphics, applications, or other device status information. As an example, the display 500 includes an implementation of an interface for the opening or accessing of a file associated with a first application 510 at a first time. For purposes of simplicity, the first application 510 in FIG. 5 is a word processor program displaying a document selection interface 512, generally configured to facilitate the user's access of various documents or files. In one implementation, first application 510 may be understood to represent a version of Microsoft Word®, or another word processing program, such as Apple Pages®, Corel WordPerfect®, Google Docs®, IBM Lotus Word Pro® and other word editing programs. However, in other implementations, the first application 510 may include any other software applications within the Microsoft Office Suite® or array of Microsoft® products, as well as any non-Microsoft® based applications.

In general, an "interface" can be understood to refer to a mechanism for communicating content through a client application to an application user. For example, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, which can trigger a change in the display of the application.

In addition, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. Thus, as non-limiting examples, an asset may include text in an actuatable pop-up window, audio associated with the interactive click of a button or other native application object, video associated with a teaching user interface, or other such information presentation.

Once a user accesses the client application (here first application 510), they may be able to view available documents, information about these documents, and/or options or tools that can be used in association with the documents or application. In some implementations, a modified files listing interface 530 (e.g., "Recently Modified Files You May Be Interested In") can be presented, where files that have been identified as being of some relevance to this user and have also undergone modifications are identified or highlighted. As a user scrolls through these files (here including a first file indicator 532, a second file indicator 534, and a third file indicator 536), he or she may navigate over or otherwise select one of the files. In this example, a mouse cursor 538 selects third file indicator 536, identified in this case by a file name "Research Paper". In response to this selection, in some implementations, a first notification 540 may appear, positioned or located adjacent to or proximate to the modified files listing interface 530. In other implementations the first notification 540 may extend outward from the modified files listing interface 530. The first notification 540 can be configured to display or present various messages or options related to the chosen document and its corresponding modifications.

As noted earlier, the system can include provisions for notifying or communicating to a user the modifications made to a current document. In one implementation, these modification events can be shown in order of the estimated likelihood of that modification being of relevance (i.e., relevance-based ranked order). However, in other implementations, modification events can be otherwise sorted, or may not be presented with any indication of relevance. Furthermore, as will be discussed in greater detail below, in different implementations, the notification(s) can be provided to a user in natural language.

In this example, for purposes of simplicity, the modifications for the third file have been summarized by a brief message "New changes are made! Edited by Mike Miller and Frankie Smith" in the first notification 540. However, it should be understood that in one implementation, the message, when selected by the user, can be expanded to describe the modifications in greater detail. Furthermore, in another implementation, each modification event listed in the expanded modifications view can comprise a selectable option or link for opening the third file 536 (e.g., in a new window, or another region of the same interface) as well as navigating the user directly to the section of the document that includes the content subject to the selected modification event. Similarly, the collapsed (or unexpanded) view of the first notification 540, as shown in FIG. 5, can also serve as a selectable option that, when actuated, opens the document at the point of the content in which the first relevant modification event has occurred, or the modification event determined to have the greatest degree of relevance for this user. In other implementations, in addition to the modification event listing, additional context can be provided that explains to the user why the system has determined this event was of higher relevance. In some implementations, a user may choose an option that opens and displays the version of the document in which the currently presented or selected modification event occurred. This option can be triggered by actuation of the event representation indicator itself in some implementations. The previous version of the same document can be opened in a new window, or in a separate region of the same interface.

It can be appreciated that this type of modification summary feature can be of great benefit across a wide range of fields. As one example, a user may be a contractor, realtor, traveling salesperson, or other worker who must frequently cope with keeping up to date with many different projects being developed by many different groups of people. This can quickly result in a backlog of documents for the user to review. By implementing the features described herein, the user can immediately view a short but highly effective preview of what new changes have occurred in the files that matter most. These types of previews can guide the user as he/she moves through each document, and enable the user to make informed choices in the prioritization of his/her projects.

A second implementation of a modification event notification feature or mechanism is depicted with reference to a display 600 presenting an application interface 650. In this example, the application interface 650 includes a first region 652 and a second region 654. Throughout this description, the first region 652 may also be referred to as a content interface, configured primarily to display portions of the selected electronic content. In addition, the second region 654 may also be referred to as a notification interface, configured primarily to display information associated with modification events for the content that is being presented or is otherwise being accessed via the first region. In this example, the first region 652 displays a first sheet 612, and the second region 654 displays a modification summary 660. The modification summary 660 further includes an overview 662, a first event 664, a second event 666, and an optional relevance legend 668.

In different implementations, the overview 662 can include a substantially compact, succinct, and/or simplified summary of the modifications that have occurred. As noted earlier, in some implementations, this summary can be communicated in natural language syntax (see FIG. 9). In this case, the overview 662 states "Mike Miller and Frankie Smith made changes." In addition, the two modification events (first event 664, second event 666) are also presented using natural language syntax. As described with reference to FIG. 5 above, the order or sorting of the plurality of events listed can be adjusted. In this example, the first event 664 states "Frankie made a few minor formatting changes", and the second event 666 states "Mike left you comments and mentions throughout". In other implementations, the presentation order of these two events can be reversed if the second event had greater relevance than the first event, for example.

Furthermore, some implementations of the notification can include provisions for quick-identification of the relative relevance of modifications in the document. In this example, the relevance legend 668 serves as a reference key, and distinguishes between "Changes most relevant to you" and "All other changes" (implementing one of the relevance models described earlier). The legend allows readers to readily and easily scan a document and observe where changes have been made while at the same time—if they so choose—only directly engaging with the changes that are distinguished as most relevant per the relevance legend 668 (see for example, a low relevance edit 672 and a high relevance edit 674). As noted earlier, in other examples, the presentation of changes (whether it is all changes, changes that occurred over a specific period of time, and/or only changes determined to be relevant to the user) can also be presented to a user via any other communication means.

Such a modification summary feature presented within the application interface can be highly advantageous to many user types. Users can access a document and quickly and efficiently learn what changes were made, whether there were changes that were of relevance to him/her specifically, who made the changes, and in some cases, when these changes were made. These features also help users focus their attention by primarily suggesting changes that have been determined to matter most.

In some implementations, additional (or alternate) information can be accessed by clicking, hovering, or otherwise issuing a command or instructions via the application interface 650. Referring next to the sequence of FIGS. 7 and 8, it can be seen that as a mouse cursor 790 hovers over a content portion 780 contained in the document in the first region 652, a new window or pop-up message 792 can be presented. The message 792 can include varying additional or alternate details regarding the content portion that has been selected. In this example, the content portion 780 is a table or spreadsheet that includes a plurality of cells, or content elements (also referred to as content sub-portions). Several cells can be designated by a different appearance or use of special indicators (e.g., shading, outline, bolding, font formatting) to alert the user to specific areas of modification. In some implementations, the appearance of these indicators can correspond to a legend (see FIG. 6) to guide users toward more relevant modification events. The message 792 also offers the user an option to view modification details for this specific content portion (here "See list of changes"). In other words, as a user hovers a mouse cursor 790 or otherwise directs their attention to a specific portion of content, the system can be configured to offer the user a more comprehensive listing of the modifications that have occurred for the selected portion, while excluding the presentation of such information for other (unselected) content portions. In some implementations, the user can also select to view only those modifications that occurred over a specific timeframe via actuation of a selectable time option 794.

Figure 7:
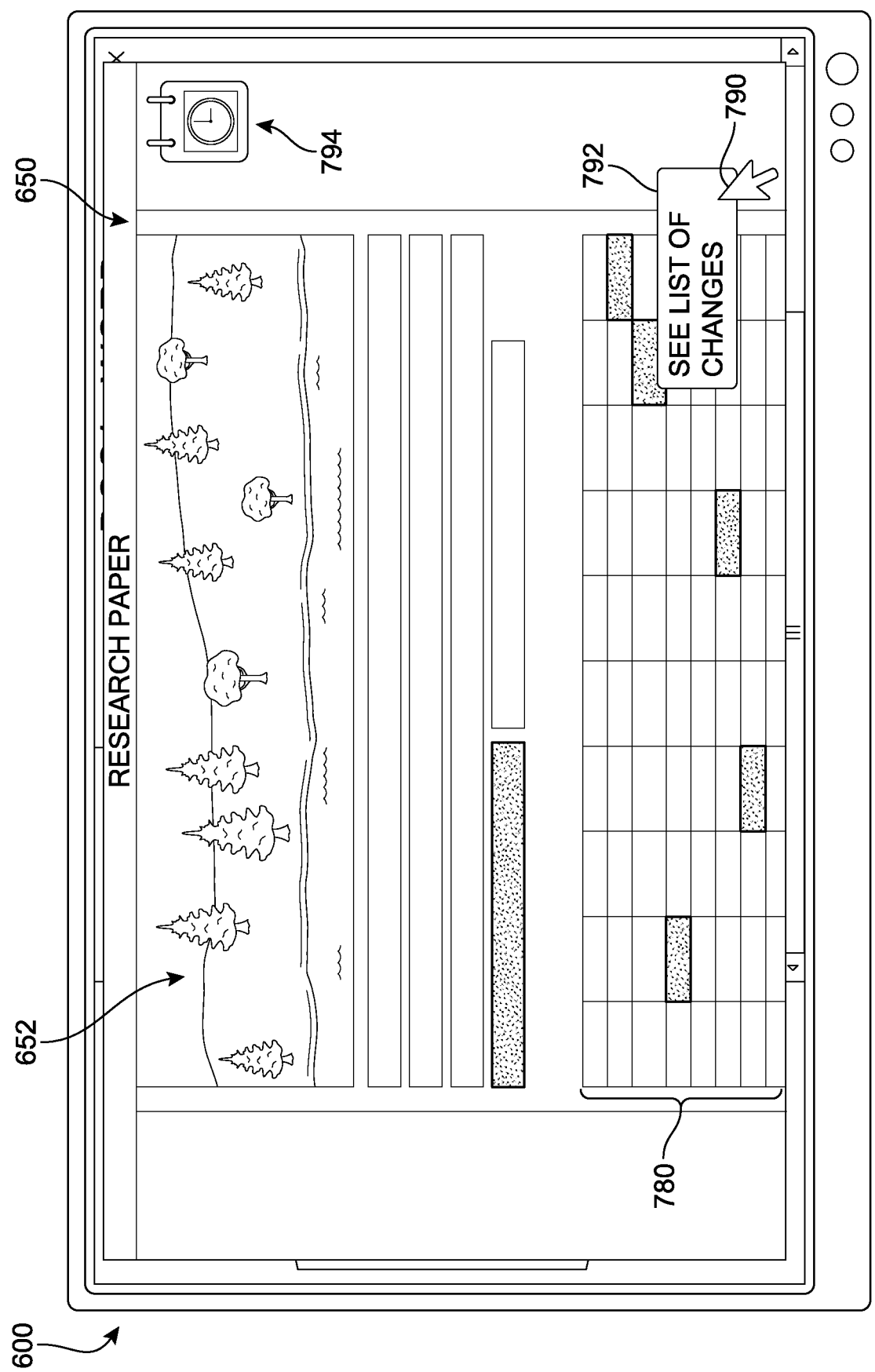
FIGS. 7 and 8 are an implementation of a document presented in an application interface in which a specific content portion is selected and only modifications made to the selected content portion are shown.
Figure 8:
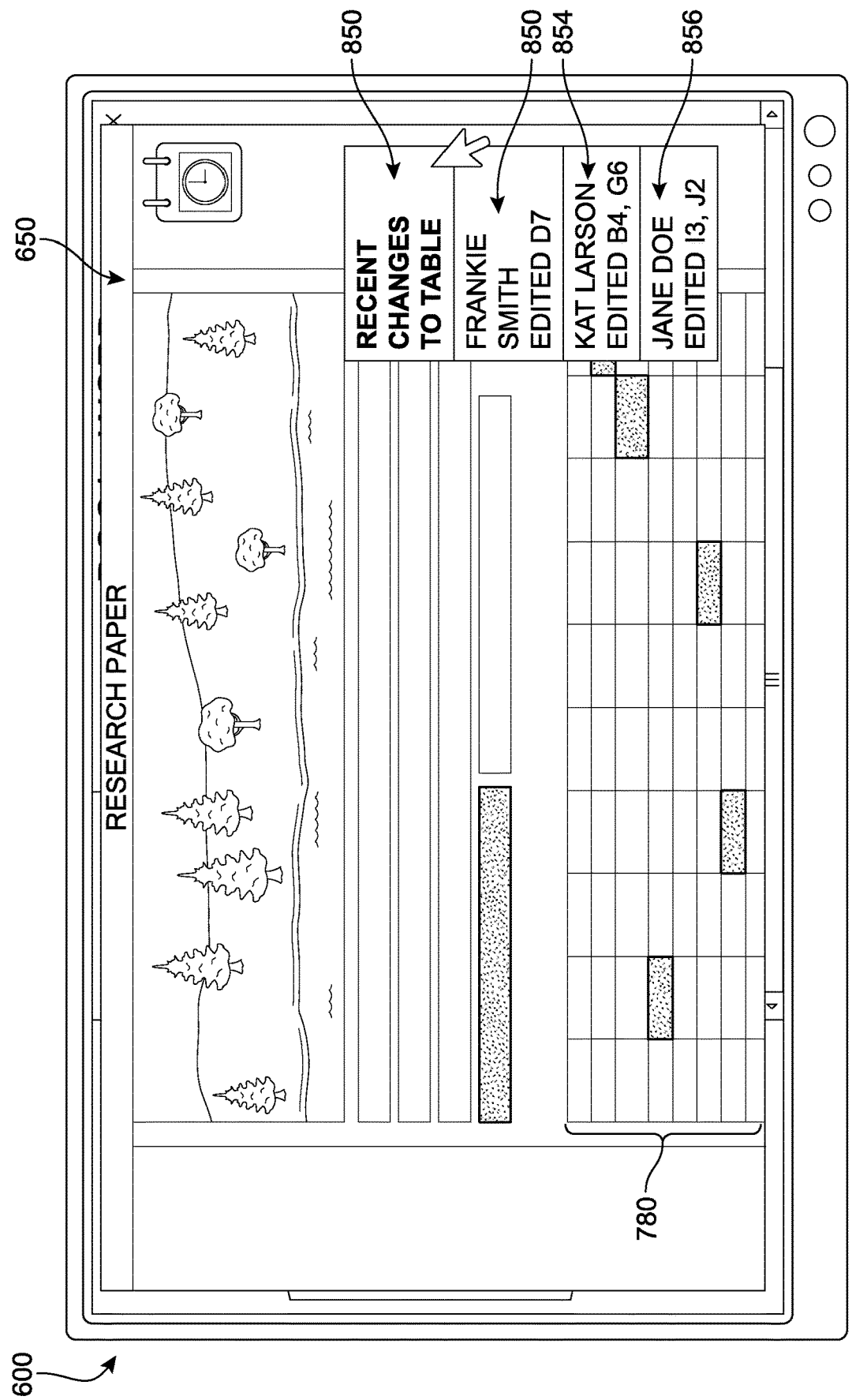

Referring now to FIG. 8, in response to a selection or actuation of the option associated with the message 792 of FIG. 7, the application interface 650 displays a content portion modification interface 850. The content portion modification interface 850 ("Recent Changes To Table") can be configured to identify, describe, itemize, and/or present some or all modification events that have occurred with respect to the currently selected content portion. In this example, the content portion modification interface 850 includes a first event representation indicator 852, a second event representation indicator 854, and a third event representation indicator 856. In this case, each event has been categorized by user, such that all modifications made by one person to the selected content portion are presented via a single event representation indicator. However, in other implementations, the events need not be grouped, and can be listed as separate indicators, or may be grouped by other features, such as date, edit type, modified element, etc.

As described earlier, in some implementations, these events can be listed in order of their assigned degree of relevance, or can be sorted by date, modifier, or other options custom selected by a user. Furthermore, in different implementations, the indicators can be actuatable options configured to navigate the user directly to the identified change. For example, following a user selection of one of the event representation indicators (e.g., first event representation indicator 852 "Frankie Smith Edited D7"), the mouse cursor can be moved directly to the cell D7, helping a user to quickly locate the edit they are interested in. In some other implementations, user selections of other event representation indicators can trigger the presentation of the modification(s) and/or selected content portion in a new window or in another region in the application interface.

In some implementations, the system can be configured to provide an option that permits a user to view additional or other modifications that are currently hidden or not immediately shown on the default or initial display. As one example, a user selection or a movement of the cursor and/or hovering of the mouse over an event representation indicator can lead to another, more detailed message, about the event or the modifier being shown, for example, in a new window, or in a text box extending outward from the indicator. In another implementation, the user selection can lead to a listing of other modifications in the document that have been made by a selected person.

The ability to select a specific content portion and navigate and review sections of the document that are of more importance to a user, without being distracted by 'background' or superfluous changes that are not of interest, can be highly advantageous to collaborative groups. Being free to select a more narrowed or restricted presentation of a document's modification events can lessen the burden of discriminating between segments of information. By simply precluding a user from inadvertently engaging with the content of a change for the portion of the text that was not actually important to them, user efficiency increases. As an example, this approach can help users maintain focus on their selected content and corresponding edits, rather than becoming distracted by changes or comments that relate to previous or later content and are not related to their selected content. It is well known in neuroscience and cognitive psychology that persons with the ability to read (i.e., those who are literate) will be compelled to automatically read any text that is placed before them, whether or not the person made a conscious decision to read that text. In other words, the brain will involuntarily and spontaneously read any alphanumeric characters or words if they become available in the person's field of view. Thus, by providing users with a means to control their focus, as well as meaningfully limiting notifications to only those that are determined to be of relevance or those associated with a specific content portion, the user can remain focused on the content relevant to them, free to reveal modification information for other content portions if their interest in those portions is piqued. This type of user experience can greatly improve workflow efficiency and accuracy.

In different implementations, the system can include provisions for adjusting, modifying, customizing, or otherwise specifying their preferred modification notification settings. As one example, the system can be configured to offer a settings user interface with a variety of options the user can use to personalize or 'tweak' the operation of the notifications and relevance criteria. As a first example, a first user may be able to request that, going forward, the user should be notified of all changes that occur as a result of a particularly identified modifier (second user). In other words, each modification made by the second user should be brought to the first user's attention automatically, regardless of the document content. In another example, a first user may request that the notifications be limited to the top three (or other number) relevant modifications that day, or for each document. A user may also be able to list the documents for which any modification should auto-generate a notification. In one implementation, a user may be able to select the specific content portion of interest and request that only changes made to that particular content portion should trigger a notification. In another example, a user can request that notifications of changes for a particular document should only remain active until a specified date, or for a limited duration (e.g., the next 3 weeks, until Mar. 14, 2025, etc.), or only those changes that occur as a result of edits made by members of a specific team (e.g., Marketing team members only, Financial team members only, Budgeting team members only, etc.), and/or for specific times or days (e.g., only changes made between 11 am and 4 pm, only meetings, changes made on a Monday, only changes occurring on a weekday, etc.). Through these options, a user can ensure their awareness of a document's development is suited to their needs and day to day routine.

In a second example, in some implementations, the system can be configured to receive input from a user specifying the type of notification they should receive. In other words, a user can request that notifications be presented by email only, via pop-up alerts, and/or text messages. The manner of display of the changes after the document is opened can also be customized in some implementations. A user may request to see a list of all modifications made since they last accessed the document in natural language syntax and in order of their estimated relevance. In another implementation, a first user may request to see all modifications made since the last instance in which the first user made a modification. In different implementations, the presentation of the various modification representation indicators can include text-based summaries of the modification that has occurred. In order to enhance the presentation and comprehension experience for a user, the system can be configured to provide short, user-readable summaries of what has occurred in the file (or content portion) since they last accessed the file. In other words, rather than simply reciting each edit as a discrete event, the system can include provisions for providing natural language description summaries that allow a reader to quickly appreciate at a high-level what changes have occurred. Generally, natural language (or natural language form or syntax) is data that is arranged in sentences and paragraphs. These data will appear for example, similar to how paragraphs are arranged in books, magazines, blogs, designed for human reading. In contrast, non-natural language form is data arranged in a form other than natural language form, such as database data, delimited data, etc. It can be appreciated that the presentation of modification event summaries in natural language form can offer users a much easier and comfortable sense of a document's progress.

As described earlier, the modification summaries or notifications can be presented at many different stages of workflow development, including when users return to the file, as they access the client application (e.g., to help a user decide whether to open the document), or personalized communications such as email and alerts. In addition, in some implementations, a summary can be provided upon access of previous versions of a file to guide users in locating the version with the changes they desire.

As one example, a user may receive a notification of a series of modification events that have occurred within a document. Instead of providing a list detailing each event, the notification can summarize which individual users participated in these edits, provide context about which user edited which portion, how significant the edits were, what type(s) of changes were made. Change types can include for example, whether the edit was an addition of content, deletion of content, comments, format change, file name change, edit to an image, table, graph, or charts changed, whether notes were added, or any other high-level change that has been made. In addition, the summary can indicate whether the file has been the subject of relatively more activity or if very few people have accessed it, as well as whether the file requires supervision or there are outstanding tasks for this file or content portion.

Figure 6:
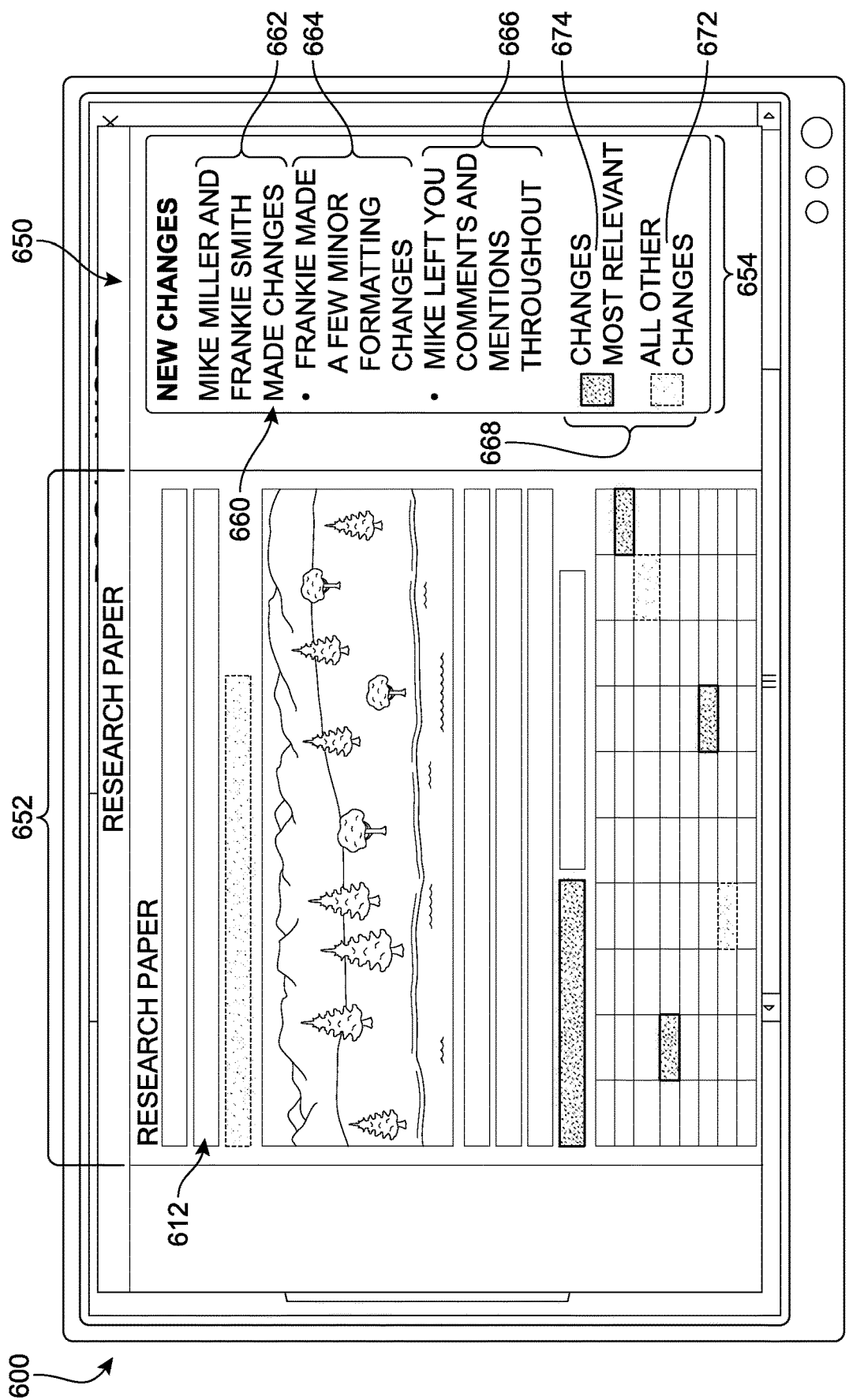
FIG. 6 is an implementation of a document presented in an application interface that includes a natural language summary of the associated with modifications made to the document.

One example was shown in FIG. 6, where as described above the "New Changes" dialog box—rather than identifying each change in the document—simply summarizes the changes by user, as well as provides a quick overview of all of the changes. In some implementations, these summaries can also note why the change being presented was identified as being of relevance to the user. For example, a notification may state, "Because you edited Table 4 last week, we believe you would be interested to know that Matthew Koper added data and a comment to the same table this morning." In some other implementations, the system can more directly state in natural language what the changes were (see FIG. 6). Typically, the information will include the name of the modifier, the date or general time period of the modification, whether there were significant changes made, and the basic type or classification of the modification. In different implementations, several modification events, when similar (e.g., of the same time), can be merged and communicated as a single item to the user, even when these events are caused by different modifiers.

Figure 9:
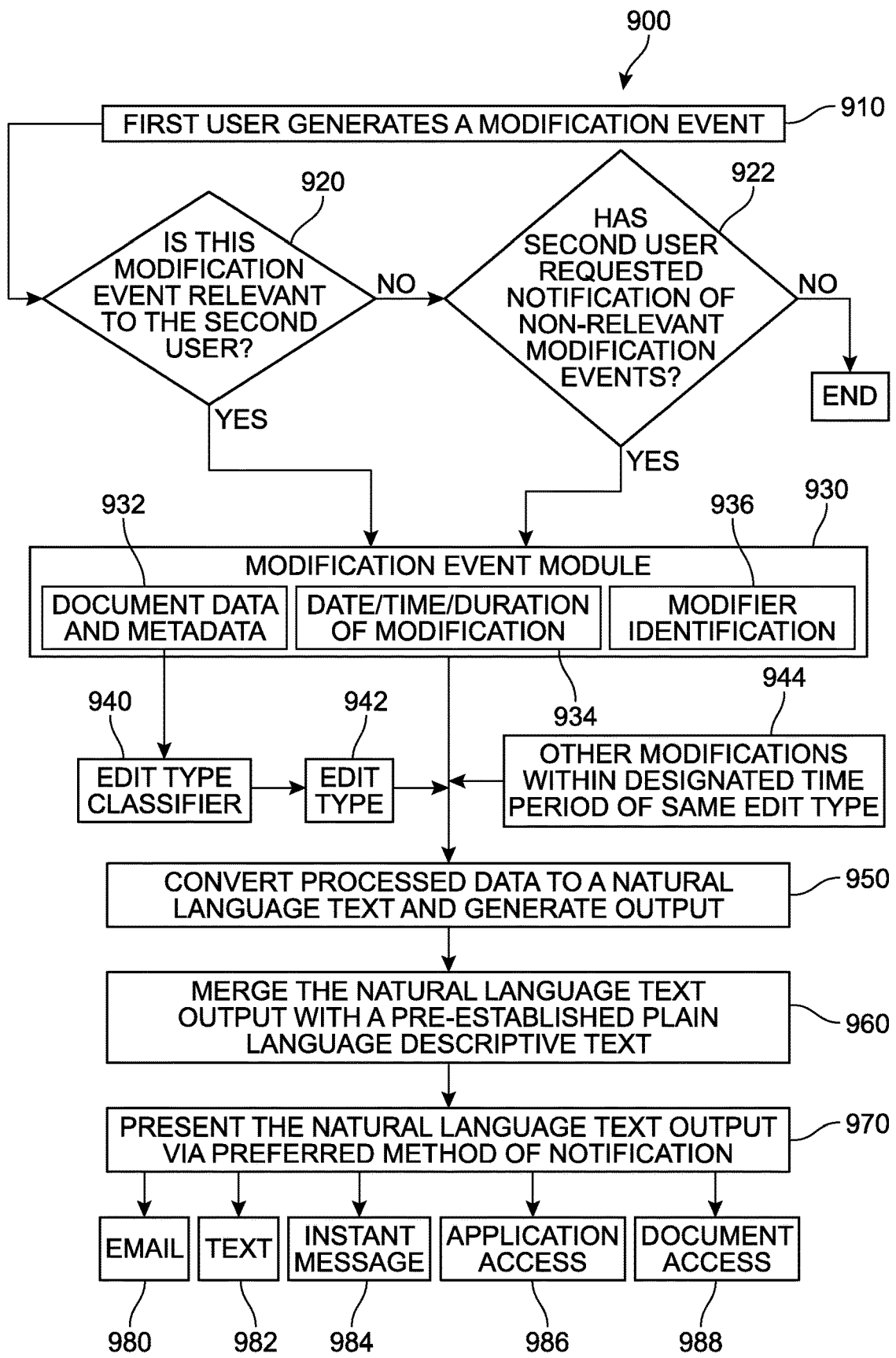
FIG. 9 is an implementation of a process of generating natural language text output.

In order to allow the reader to better appreciate some of the aspects described herein, FIG. 9 presents a flow diagram of one implementation of a natural language modification notification system. In a first step 910, a first user may generate a modification event, which will be recognized by the system. At a second step 920, if the event is deemed relevant for the second user (as described earlier), the system can access a variety of information and contextual data about the modification event in a third step 930. If the event was not considered relevant, the process can nevertheless continue if the second user settings or system default are configured to convey any modification event to the second user (first substep 922), regardless of whether it met the relevance threshold. Otherwise, the process may end.

Referring again to the third step 930, the modification event module can be configured to receive a wide range of information, including but not limited to document data and metadata 932, date/time/duration of modification 934, and information about the modifier (i.e., the first user) 936. In addition, the data can be sent to an edit type classifier 940, which can be configured to determine what category or class of modification the event falls within (e.g., a formatting event, a revision, an addition, an image edit, a deletion, etc.) to produce an edit type label or classification 942. The edit classification and general modification event module information can be submitted to a processor in a fourth step 950, which is configured to process and convert the processed data to a natural language text. In different implementations, there may be other edits throughout the document made by other users that were of a similar edit type. For example, James may have added a column to Table 5, and Tina may have modified data in Table 5. The system can collect or merge information from different modification events to allow for a more succinct, compact, and effective summary. Thus, rather than stating each event in a separate line item, the system can note, for example, "James and Tina have edited Table 5". As another example, if James added a comment to page 3 and Tina added a comment to page 4, the system can note, for example, "James and Tina have added comments to pages 3 and 4." In another example, the time period can be included to note "James and Tina edited Table 5 yesterday" or "James and Tina added comments on Tuesday."

In some implementations, this output can be sent in a fifth step 960 to be merged with a pre-established plain language descriptive text, which recites in natural language a summary of the modification event(s). The natural language textual output can be communicated to the second user in a sixth step 970, as per system settings, including but not limited to email 980, text 982, instant message 984, upon the second user's access of the client application 986, and/or upon the second user's access of the document 988.

Figure 10:
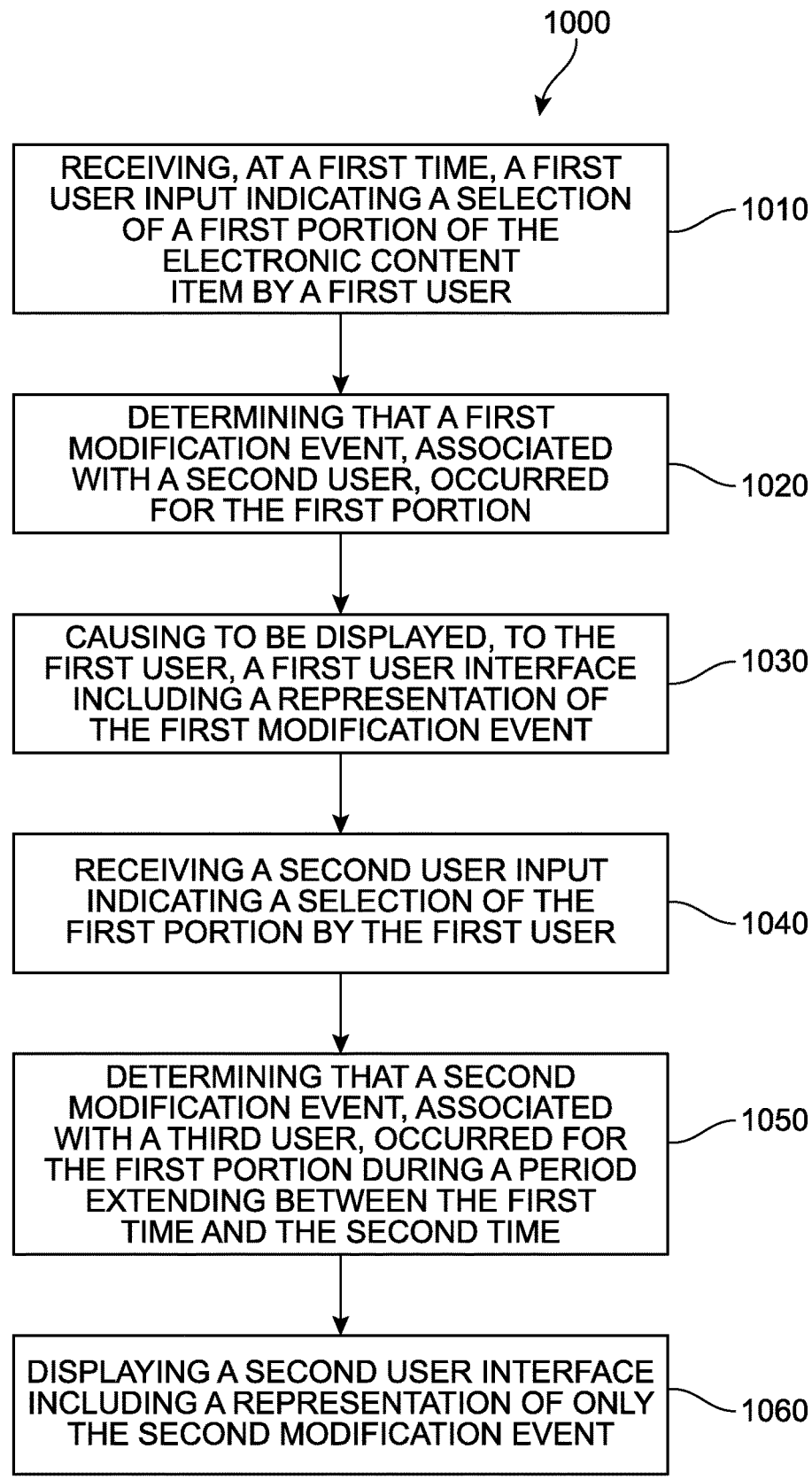
FIG. 10 is a flow diagram of an implementation of a method of determining a relevance of a modification event for a user and providing the user with a notification of the modification event.

FIG. 10 is a flow chart illustrating an implementation of a method 1000 of presenting information for one or more modification events associated with portions of an electronic content item. A first step 1010 includes receiving, at a first time, a first user input indicating a selection of a first portion of the electronic content item by a first user, the first portion being smaller than an entirety of the electronic content item. A second step 1020 includes determining that a first modification event, associated with a second user, occurred for at least a first sub-portion of the first portion prior to the first time. In addition, a third step 1030 includes causing to be displayed, to the first user, in response to determining that the first modification event has occurred and receiving the first user input, a first user interface including a representation of the first modification event. Furthermore, a fourth step 1040 includes receiving, at a second time subsequent to the first time, a second user input indicating a selection of the first portion of the electronic content item by the first user, and a fifth step 1050 involves determining that a second modification event, associated with a third user, occurred for at least a first sub-portion of the first portion during a period extending between the first time and the second time. In a sixth step 1060, the method includes causing to be displayed, to the first user, in response to determining that the second modification event has occurred and receiving the second user input, a second user interface including a representation of only the second modification event.

In other implementations, the method may include additional steps or aspects. As one example, the method may further include receiving, at a second time subsequent to the first time, a second user input indicating a selection of the first portion of the electronic content item by the first user, as well as determining that a second modification event, associated with a third user, occurred for at least a first sub-portion of the first portion during a period extending between the first time and the second time. The method may also include causing to be displayed, to the first user, in response to determining that the second modification event has occurred and receiving the second user input, a second user interface including a representation of only the second modification event.

In some implementations, the method can also include determining that a second modification event, associated with a third user, occurred for at least the first sub-portion of the first portion prior to the first modification event, and then receiving, at a second time subsequent to the first time, a second user input indicating a selection of a first selectable option of the first user interface. Another step may include causing to be displayed, to the first user, in response to receiving the second user input, a second user interface including a representation of both the first modification event and the second modification event.

In one implementation, the first user interface includes a first selectable option for filtering modification events by modifier. In such a case, the method may further involve determining that a plurality of modification events including the first modification event have occurred for at least the first sub-portion of the first portion prior to the first time, receiving, at a second time subsequent to the first time, a second user input indicating a selection of the first selectable option, and then causing to be displayed, to the first user, in response to receiving the second user input, a second user interface including at least a second selectable option for selecting a username associated with one or more of the plurality of modification events. The method may further involve receiving, at a third time subsequent to the second time, a third user input indicating a selection of the second selectable option, and then causing to be displayed, to the first user, in response to receiving the third user input, a third user interface including a representation of each modification event associated with the selected username.

As another example, the first user interface can include a first selectable option for presenting additional modification event representations. In such cases, the method may further include determining that a plurality of modification events including the first modification event have occurred for at least the first sub-portion of the first portion prior to the first time, as well as receiving, at a second time subsequent to the first time, a second user input indicating a selection of the first selectable option. In addition, the method can include a step of causing to be displayed, to the first user, in response to receiving the second user input, a second user interface including a representation of each modification event of the plurality of modification events.

In some implementations, the first user interface can include a first selectable option for filtering modification events occurring during a particular period of time. In these implementations, the method may also include a step of determining that a plurality of modification events including the first modification event have occurred for at least the first sub-portion of the first portion prior to the first time, as well as receiving, at a second time subsequent to the first time, a second user input indicating a selection of the first selectable option. The method may further include causing to be displayed, to the first user, in response to receiving the second user input, a second user interface including at least a second selectable option for selecting a period of time. In addition, the method can involve receiving, at a third time subsequent to the second time, a third user input indicating a selection of the second selectable option, and then causing to be displayed, to the first user, in response to receiving the third user input, a third user interface including a representation of each modification event that occurred within the selected period of time.

In another implementation, the first user interface includes a first selectable option for accessing a previous version of the electronic content item in its substantial entirety. The method can then include a step of receiving, at a second time subsequent to the first time, a second user input indicating a selection of the first selectable option, and then causing to be displayed, to the first user, in response to receiving the second user input, a second user interface presenting a version of the electronic content item that was created when the first modification event occurred.

In some other implementations, the method can include steps of identifying a plurality of content portions, including the first content portion, for which a modification event has occurred, and then determining that a subset of the plurality of content portions is of particular relevance to a third user. In addition, the method may involve generating, in response to determining that the subset is of particular relevance to the third user, a message in which each modification event associated with the subset is described in natural language, and then causing the message to be presented to the third user. In one implementation, the step of determining that the subset is of particular relevance to the third user is based on a record of the third user performing at least one interaction event for one or more content portions in the subset. In another implementation, the subset includes the first content portion, and the step of determining that the first content portion is of particular relevance to the third user is based on at least a communication history between the third user and the second user.

As another example, the method can further include identifying a plurality of modification events, including a first modification event and a second modification event, that have occurred for the electronic content item, and then determining at least the first modification event is of greater relevance to a third user than the second modification event. In addition, the method can include generating, in response to determining that at least the first modification event is of greater relevance, a message in which at least the first modification event is identified, and then causing the message to be presented to the third user. In one implementation, the step of determining that the first modification event is of greater relevance to the third user is based on a record of the third user performing at least one interaction event with a content portion associated with the first modification event. In another implementation, the first modification event is associated with the first content portion, and determining that the first modification event is of greater relevance to the third user is based on at least a communication history between the third user and the second user.

In one example, the method can also include causing to be displayed, to the first user, a second user interface including a first selectable preference for requesting notification of any modification events for a specific document, as well as receiving a second user input corresponding to a selection of the first selectable preference including a designation of a specific document. In addition, the method includes determining that a second modification event, associated with a third user, occurred for at least a portion of the designated document, and subsequently causing to be displayed, to the first user, in response to determining that the second modification event has occurred and receiving the second user input, a third user interface including a representation of the second modification event.

In some cases, the method can include causing to be displayed, to the first user, a second user interface including a first selectable preference for requesting notification of any modification events by a specific user account, and then receiving a second user input corresponding to a selection of the first selectable preference including a designation of a user account corresponding to a third user. In addition, the method can involve determining that a second modification event associated with the designated third user has occurred, and causing to be displayed, to the first user, in response to determining that the second modification event has occurred and receiving the second user input, a third user interface including a representation of the second modification event.

Other methods can also be contemplated within the scope of this disclosure. For example, a method of presenting information for one or more modification events associated with portions of an electronic content item can include a first step of determining that a modification event, associated with a first user, occurred for at least a portion of the electronic content item, and a second step of determining the modification event is associated with a high likelihood of being relevant to a second user. In a third step, the method can include causing to be displayed, to the second user, in response to determining that the modification event has occurred and includes a high likelihood of being relevant to the second user, a first user interface including a representation of the modification event. In some implementations, the step of determining that the modification event is associated with a high likelihood of being relevant to the second user is based on a record of the second user performing at least one interaction event with any portion of the electronic content item.

The disclosed implementations offer users a convenient, practical, and efficient means of staying aware of document developments, allowing the user to return after a period of time and quickly discover how the document changed over whatever time since they had last looked at the document. Such a feature encourages users to stay 'in the flow' of their current priorities and projects. In addition, the burden on the system and/or network can be smaller because there will not necessarily be a need to load the full file history. Instead, data associated with only specific portions of content that a user selects. Furthermore, when users return to a file, the quick change summaries described herein can direct users to those aspects that are relevant to them, providing a natural language overview of those changes and offering more comfortable, relatable, and powerful user experience.

The detailed examples of systems, devices, and techniques described in connection with FIGS. 1-10 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-10 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 11:
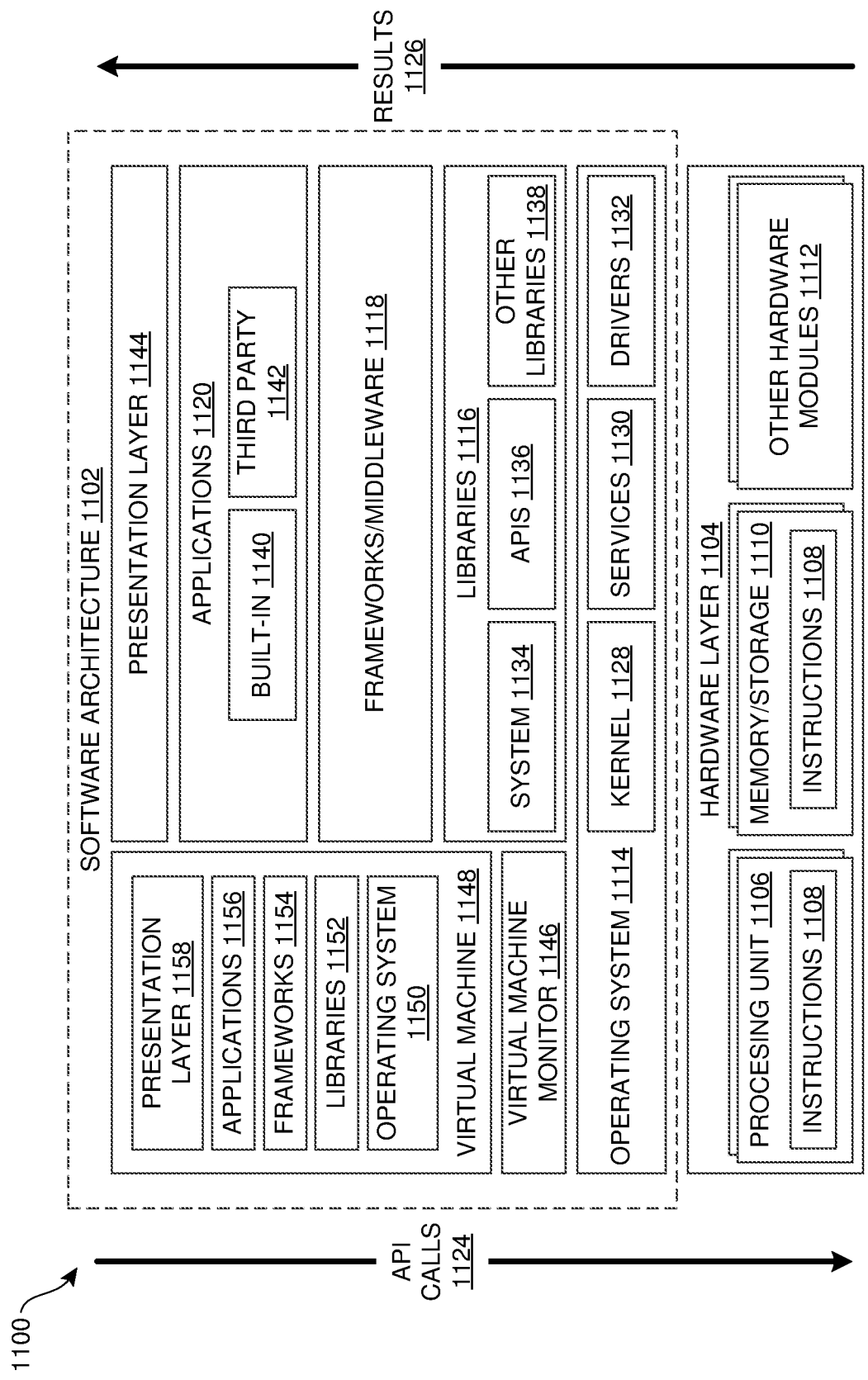
FIG. 11 is a block diagram of an example computing device, which may be used to provide implementations of the mechanisms described herein.

FIG. 11 is a block diagram 1100 illustrating an example software architecture 1102, various portions of which may be used in conjunction with various hardware architectures herein described, which may implement any of the above-described features. FIG. 11 is a non-limiting example of a software architecture and it will be appreciated that many other architectures may be implemented to facilitate the functionality described herein. The software architecture 1102 may execute on hardware such as a device 120 of FIG. 1 that includes, among other things, document storage 1070, processors, memory, and input/output (I/O) components. A representative hardware layer 1104 is illustrated and can represent, for example, the device 120 of FIG. 1. The representative hardware layer 1104 includes a processing unit 1106 and associated executable instructions 1108. The executable instructions 1108 represent executable instructions of the software architecture 1102, including implementation of the methods, modules and so forth described herein. The hardware layer 1104 also includes a memory/storage 1110, which also includes the executable instructions 1108 and accompanying data. The hardware layer 1104 may also include other hardware modules 1112. Instructions 1108 held by processing unit 1108 may be portions of instructions 1108 held by the memory/storage 1110.

The example software architecture 1102 may be conceptualized as layers, each providing various functionality. For example, the software architecture 1102 may include layers and components such as an operating system (OS) 1114, libraries 1116, frameworks 1118, applications 1120, and a presentation layer 1144. Operationally, the applications 1120 and/or other components within the layers may invoke API calls 1124 to other layers and receive corresponding results 1126. The layers illustrated are representative in nature and other software architectures may include additional or different layers. For example, some mobile or special purpose operating systems may not provide the frameworks/middleware 1118.

The OS 1114 may manage hardware resources and provide common services. The OS 1114 may include, for example, a kernel 1128, services 1130, and drivers 1132. The kernel 1128 may act as an abstraction layer between the hardware layer 1104 and other software layers. For example, the kernel 1128 may be responsible for memory management, processor management (for example, scheduling), component management, networking, security settings, and so on. The services 1130 may provide other common services for the other software layers. The drivers 1132 may be responsible for controlling or interfacing with the underlying hardware layer 1104. For instance, the drivers 1132 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1116 may provide a common infrastructure that may be used by the applications 1120 and/or other components and/or layers. The libraries 1116 typically provide functionality for use by other software modules to perform tasks, rather than rather than interacting directly with the OS 1114. The libraries 1116 may include system libraries 1134 (for example, C standard library) that may provide functions such as memory allocation, string manipulation, file operations. In addition, the libraries 1116 may include API libraries 1136 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1116 may also include a wide variety of other libraries 1138 to provide many functions for applications 1120 and other software modules.

The frameworks 1118 (also sometimes referred to as middleware) provide a higher-level common infrastructure that may be used by the applications 1120 and/or other software modules. For example, the frameworks 1118 may provide various graphic user interface (GUI) functions, high-level resource management, or high-level location services. The frameworks 1118 may provide a broad spectrum of other APIs for applications 1120 and/or other software modules.

The applications 1120 include built-in applications 1140 and/or third-party applications 1142. Examples of built-in applications 1140 may include, but are not limited to, a contacts application, a browser application, a location application, a media application, a messaging application, and/or a game application. Third-party applications 1142 may include any applications developed by an entity other than the vendor of the particular platform. The applications 1120 may use functions available via OS 1114, libraries 1116, frameworks 1118, and presentation layer 1144 to create user interfaces to interact with users.

Some software architectures use virtual machines, as illustrated by a virtual machine 1148. The virtual machine 1148 provides an execution environment where applications/modules can execute as if they were executing on a hardware machine (such as the machine 1000 of FIG. 10, for example). The virtual machine 1148 may be hosted by a host OS (for example, OS 1114) or hypervisor, and may have a virtual machine monitor 1146 which manages operation of the virtual machine 1148 and interoperation with the host operating system. A software architecture, which may be different from software architecture 1102 outside of the virtual machine, executes within the virtual machine 1148 such as an OS 1150, libraries 1152, frameworks 1154, applications 1156, and/or a presentation layer 1158.

Figure 12:
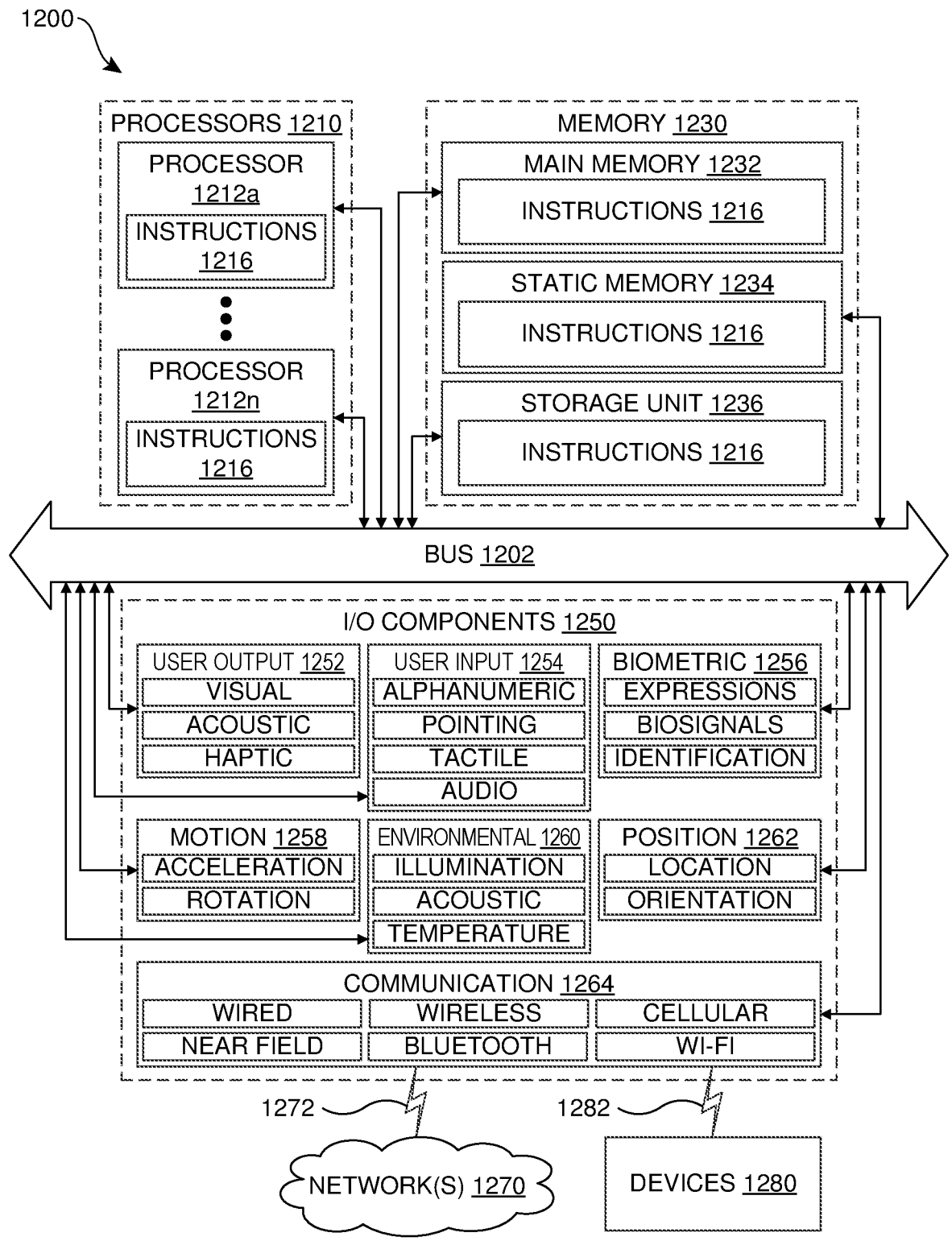
FIG. 12 is a block diagram illustrating components of an example machine configured to read instructions from a machine-readable medium.

FIG. 12 is a block diagram illustrating components of an example machine 1200 configured to read instructions from a machine-readable medium (for example, a machine-readable storage medium) and perform any of the features described herein. The example machine 1200 is in a form of a computer system, within which instructions 1216 (for example, in the form of software components) for causing the machine 1200 to perform any of the features described herein may be executed. As such, the instructions 1216 may be used to implement modules or components described herein. The instructions 1216 cause unprogrammed and/or unconfigured machine 1200 to operate as a particular machine configured to carry out the described features. The machine 1200 may be configured to operate as a standalone device or may be coupled (for example, networked) to other machines. In a networked deployment, the machine 1200 may operate in the capacity of a server machine or a client machine in a server-client network environment, or as a node in a peer-to-peer or distributed network environment. Machine 1200 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1200 is illustrated, the term "machine" include a collection of machines that individually or jointly execute the instructions 1216.

The machine 1200 may include processors 1210, memory 1230, and I/O components 1250, which may be communicatively coupled via, for example, a bus 1202. The bus 1202 may include multiple buses coupling various elements of machine 1200 via various bus technologies and protocols. In an example, the processors 1210 (including, for example, a central processing unit (CPU), a graphics processing unit (GPU), a digital signal processor (DSP), an ASIC, or a suitable combination thereof) may include one or more processors 1212a to 1212n that may execute the instructions 1216 and process data. In some examples, one or more processors 1210 may execute instructions provided or identified by one or more other processors 1210. The term "processor" includes a multi-core processor including cores that may execute instructions contemporaneously. Although FIG. 12 shows multiple processors, the machine 1200 may include a single processor with a single core, a single processor with multiple cores (for example, a multi-core processor), multiple processors each with a single core, multiple processors each with multiple cores, or any combination thereof. In some examples, the machine 1200 may include multiple processors distributed among multiple machines.

The memory/storage 1230 may include a main memory 1232, a static memory 1234, or other memory, and a storage unit 1236, both accessible to the processors 1210 such as via the bus 1202. The storage unit 1236 and memory 1232, 1234 store instructions 1216 embodying any one or more of the functions described herein. The memory/storage 1230 may also store temporary, intermediate, and/or long-term data for processors 1210. The instructions 1216 may also reside, completely or partially, within the memory 1232, 1234, within the storage unit 1236, within at least one of the processors 1210 (for example, within a command buffer or cache memory), within memory at least one of I/O components 1250, or any suitable combination thereof, during execution thereof. Accordingly, the memory 1232, 1234, the storage unit 1236, memory in processors 1210, and memory in I/O components 1250 are examples of machine-readable media.

As used herein, "machine-readable medium" refers to a device able to temporarily or permanently store instructions and data that cause machine 1200 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1216) for execution by a machine 1200 such that the instructions, when executed by one or more processors 1210 of the machine 1200, cause the machine 1200 to perform and one or more of the features described herein. Accordingly, a "machine-readable medium" may refer to a single storage device, as well as "cloud-based" storage systems or storage networks that include multiple storage apparatus or devices.

The I/O components 1250 may include a wide variety of hardware components adapted to receive input, provide output, produce output, transmit information, exchange information, capture measurements, and so on. The specific I/O components 1250 included in a particular machine will depend on the type and/or function of the machine. For example, mobile devices such as mobile phones may include a touch input device, whereas a headless server or IoT device may not include such a touch input device. The particular examples of I/O components illustrated in FIG. 12 are in no way limiting, and other types of components may be included in machine 1200. The grouping of I/O components 1250 are merely for simplifying this discussion, and the grouping is in no way limiting. In various examples, the I/O components 1250 may include user output components 1252 and user input components 1254. User output components 1252 may include, for example, display components for displaying information (for example, a liquid crystal display (LCD) or a projector), acoustic components (for example, speakers), haptic components (for example, a vibratory motor or force-feedback device), and/or other signal generators. User input components 1254 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1250 may include biometric components 1256 and/or position components 1262, among a wide array of other environmental sensor components. The biometric components 1256 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1262 may include, for example, location sensors (for example, a Global Position System (GPS) receiver), altitude sensors (for example, an air pressure sensor from which altitude may be derived), and/or orientation sensors (for example, magnetometers).

The I/O components 1250 may include communication components 1264, implementing a wide variety of technologies operable to couple the machine 1200 to network(s) 1270 and/or device(s) 1280 via respective communicative couplings 1272 and 1282. The communication components 1264 may include one or more network interface components or other suitable devices to interface with the network (s) 1270. The communication components 1264 may include, for example, components adapted to provide wired communication, wireless communication, cellular communication, Near Field Communication (NFC), Bluetooth communication, Wi-Fi, and/or communication via other modalities. The device(s) 1280 may include other machines or various peripheral devices (for example, coupled via USB).

In some examples, the communication components 1264 may detect identifiers or include components adapted to detect identifiers. For example, the communication components 1264 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1262, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A data processing system comprising:
   at least one processor; and
   one or more computer readable media including instructions which, when executed by the at least one processor, cause the at least one processor to:
   receive, at a first time, a first user input indicating a selection of a first portion of an electronic content item by a first user, the first portion being smaller than an entirety of the electronic content item;
   determine that a first modification event, associated with a second user, occurred for at least a first sub-portion of the first portion prior to the first time;
   cause to be displayed, to the first user, in response to determining that the first modification event has occurred and receiving the first user input, a first user interface including a representation of the first modification event;
   cause to be displayed, to the first user, a second user interface including a first selectable preference for requesting notification of modification events for the electronic content item;
   receive a second user input corresponding to a selection of the first selectable preference;
   determine that a second modification event, associated with a third user, occurred for at least a portion of the electronic content item at a second time subsequent to the first time;
   notify the first user of an occurrence of the second modification event;
   receive, at a third time subsequent to the second time, a third user input indicating a selection of the first portion of the electronic content item by the first user;
   determine that the second modification event, associated with the third user, occurred for at least a first sub-portion of the first portion during a period extending between the first time and the second time;
   cause to be displayed, to the first user, in response to determining that the second modification event has occurred and receiving the third user input, a second user interface including a representation of only the second modification event, and
   prevent from being displayed, to the first user, the first user interface including the representation of the first modification event, in response to a determination that the first modification event has occurred but fails to include a high likelihood of being relevant to the first user, as determined by a machine learning model, wherein the instructions, when executed by the at least one processor, cause the at least one processor to query the first user as to whether the determination that the first modification event does not include a high likelihood of being relevant to the first user is correct, and, based upon an indication by the first user that the determination is not correct, allowing the first user interface to be displayed to the first user, and updating the machine learning model.

2. The system of claim 1, wherein the instructions further cause the at least one processor to:
identify a plurality of modification events, including the first modification event and the second modification event, that have occurred for the electronic content item;
determine at least the first modification event is of greater relevance to a fourth user than the second modification event;
generate, in response to determining that at least the first modification event is of greater relevance, a message in which at least the first modification event is identified; and
cause the message to be presented to the fourth user.

3. The system of claim 1, wherein the first user interface includes a first selectable option for filtering modification events by modifier, and wherein the instructions further cause the at least one processor to:
determine that a plurality of modification events including the first modification event have occurred for at least the first sub-portion of the first portion prior to the first time;
receive, at a third time subsequent to the first time, a fourth user input indicating a selection of the first selectable option; and
cause to be displayed, to the first user, in response to receiving the fourth user input, a third user interface including a representation of each modification event associated with a selected username.

4. The system of claim 1, wherein the first user interface includes a first selectable option for accessing a previous version of the electronic content item in its substantial entirety, and wherein the instructions further cause the at least one processor to:
receive, at a third time subsequent to the first time, a fourth user input indicating a selection of the first selectable option; and
cause to be displayed, to the first user, in response to receiving the fourth user input, a third user interface presenting a version of the electronic content item that was created when the first modification event occurred.

5. The system of claim 1, wherein the instructions further cause the at least one processor to:
cause to be displayed, to the first user, the second user interface including the first selectable preference for requesting notification of any modification events for a specific document;
receive a fourth user input corresponding to a selection of the first selectable preference including a designation of a specific document;
determine that a third modification event, associated with a third user, occurred for at least a portion of the designated document; and
cause to be displayed, to the first user, in response to determining that the third modification event has occurred and receiving the fourth user input, a fourth user interface including a representation of the third modification event.

6. A method of presenting information for one or more modification events associated with portions of an electronic content item, the method comprising:
receiving, at a first time, a first user input indicating a selection of a first portion of the electronic content item by a first user, the first portion being smaller than an entirety of the electronic content item;
determining that a first modification event, associated with a second user, occurred for at least a first sub-portion of the first portion prior to the first time;
causing to be displayed, to the first user, in response to determining that the first modification event has occurred and receiving the first user input, a first user interface including a representation of the first modification event;
causing to be displayed, to the first user, a second user interface including a first selectable preference for requesting notification of modification events for the electronic content item;
receiving a second user input corresponding to a selection of the first selectable preference;
determining that a second modification event, associated with a third user, occurred for at least a portion of the electronic content item at a second time subsequent to the first time;
notifying the first user of an occurrence of the second modification event;
receiving, at a third time subsequent to the second time, a third user input indicating a selection of the first portion of the electronic content item by the first user;
determining that the second modification event, associated with the third user, occurred for at least a first sub-portion of the first portion during a period extending between the first time and the second time;
causing to be displayed, to the first user, in response to determining that the second modification event has occurred and receiving the third user input, a second user interface including a representation of only the second modification event,
preventing the first user interface, including the representation of the first modification event, from being displayed to the first user, in response to a determination that the first modification event has occurred but fails to include a high likelihood of being relevant to the first user, as determined by a machine learning model, and
querying the first user as to whether the determination that the first modification event does not include a high likelihood of being relevant to the first user is correct, and, based upon an indication by the first user that the determination is not correct, allowing the first user interface to be displayed to the first user, and updating the machine learning model.

7. The method of claim 6, further comprising:
determining that a third modification event, associated with a fourth user, occurred for at least the first sub-portion of the first portion prior to the first modification event;
receiving, at a third time subsequent to the first time, a fourth user input indicating a selection of a first selectable option of the first user interface; and
causing to be displayed, to the first user, in response to receiving the fourth user input, a third user interface including a representation of both the first modification event and the third modification event.

8. The method of claim 6, wherein the first user interface includes a first selectable option for filtering modification events by modifier, and wherein the method further comprises:
  determining that a plurality of modification events including the first modification event have occurred for at least the first sub-portion of the first portion prior to the first time;
  receiving, at a third time subsequent to the first time, a fourth user input indicating a selection of the first selectable option;
  causing to be displayed, to the first user, in response to receiving the fourth user input, a third user interface including at least a second selectable option for selecting a username associated with one or more of the plurality of modification events;
  receiving, at a fourth time subsequent to the second time, a fifth user input indicating a selection of the second selectable option; and
  causing to be displayed, to the first user, in response to receiving the fifth user input, a fourth user interface including a representation of each modification event associated with a selected username.

9. The method of claim 6, wherein the first user interface includes a first selectable option for presenting additional modification event representations, and wherein the method further comprises:
  determining that a plurality of modification events including the first modification event have occurred for at least the first sub-portion of the first portion prior to the first time;
  receiving, at a third time subsequent to the first time, a fourth user input indicating a selection of the first selectable option; and
  causing to be displayed, to the first user, in response to receiving the fourth user input, a third user interface including a representation of each modification event of the plurality of modification events.

10. The method of claim 6, wherein the first user interface includes a first selectable option for filtering modification events occurring during a particular period of time, and wherein the method further comprises:
  determining that a plurality of modification events including the first modification event have occurred for at least the first sub-portion of the first portion prior to the first time;
  receiving, at a third time subsequent to the first time, a fourth user input indicating a selection of the first selectable option;
  causing to be displayed, to the first user, in response to receiving the fourth user input, a third user interface including at least a second selectable option for selecting a period of time;
  receiving, at a fourth time subsequent to the second time, a fifth user input indicating a selection of the second selectable option; and
  causing to be displayed, to the first user, in response to receiving the fifth user input, a fourth user interface including a representation of each modification event that occurred within the selected period of time.

11. The method of claim 6, wherein the first user interface includes a first selectable option for accessing a previous version of the electronic content item in its substantial entirety, and the method further comprises:
  receiving, at a third time subsequent to the first time, a fourth user input indicating a selection of the first selectable option; and
  causing to be displayed, to the first user, in response to receiving the fourth user input, a third user interface presenting a version of the electronic content item that was created when the first modification event occurred.

12. The method of claim 6, further comprising:
  identifying a plurality of modification events, including the first modification event and the second modification event, that have occurred for the electronic content item;
  determining at least the first modification event is of greater relevance to a fourth user than the second modification event;
  generating, in response to determining that at least the first modification event is of greater relevance, a message in which at least the first modification event is identified; and
  causing the message to be presented to the fourth user.

13. The method of claim 12, wherein determining that the first modification event is of greater relevance to the fourth user is based on a record of the third user performing at least one interaction event with a content portion associated with the first modification event.

14. The method of claim 12, wherein:
  the first modification event is associated with the first content portion; and
  determining that the first modification event is of greater relevance to the fourth user is based on at least a communication history between the fourth user and the second user.

15. The method of claim 6, further comprising:
  receiving a fourth user input corresponding to the selection of the first selectable preference including a designation of a specific document;
  determining that a third modification event, associated with a fourth user, occurred for at least a portion of the designated document; and
  causing to be displayed, to the first user, in response to determining that the second modification event has occurred and receiving the fourth user input, a third user interface including a representation of the second modification event.

16. The method of claim 6, further comprising:
  causing to be displayed, to the first user, a third user interface including a first selectable preference for requesting notification of any modification events by a specific user account;
  receiving a fourth user input corresponding to a selection of the first selectable preference including a designation of a user account corresponding to a fourth user;
  determining that a third modification event associated with the designated fourth user has occurred; and
  causing to be displayed, to the first user, in response to determining that the third modification event has occurred and receiving the fourth user input, a fourth user interface including a representation of the second modification event.

17. A data processing system for presenting information for one or more modification events associated an electronic content item, the system comprising:
  at least one processor; and
  one or more computer readable media including instructions which, when executed by the at least one processor, cause the at least one processor to:

determine that a modification event, associated with a first user, occurred for at least a first portion of the electronic content item;

determine the modification event is associated with a high likelihood of being relevant to a second user by analyzing the modification event using a machine learning model trained to predict a relevance of modification events to users, wherein the machine learning model is trained at least in part based on user interactions with the data processing system;

cause to be displayed, to the second user, in response to the determination that the modification event has occurred and includes a high likelihood of being relevant to the second user, a first user interface including a representation of the modification event, and prevent from being displayed, to the second user, the first user interface including the representation of the modification event, in response to a determination that the modification event has occurred but fails to include the high likelihood of being relevant to the second user, as determined by the machine learning model, wherein the instructions, when executed by the at least one processor, cause the at least one processor to query the second user as to whether the determination that the modification event does not include a high likelihood of being relevant to the second user is correct, and, based upon an indication by the second user that the determination is not correct, allowing the first user interface to be displayed to the second user, and updating the machine learning model.

18. The system of claim 17, wherein the determination that the modification event is associated with a high likelihood of being relevant to the second user is based at least on a record of the second user performing at least one interaction event with any portion of the electronic content item.

19. The system of claim 17, wherein the determination that the modification event has occurred is based on a record of a change to the electronic content item being saved.

20. The system of claim 17, wherein the determination that the modification event is associated with a high likelihood of being relevant to the second user occurs automatically as a result of an application of a trained machine model.

21. The system of claim 17, wherein the determination that the modification event is associated with a high likelihood of being relevant to the second user occurs as a result of input received by the second user indicating that changes to the first portion should trigger a notification to the second user.

22. The system of claim 17, wherein the determination that the modification event is associated with a high likelihood of being relevant to the second user is based at least on identification of a relationship existing between the first user and the second user.

23. The system of claim 17, wherein the determination that the modification event is associated with a high likelihood of being relevant to the second user is based at least on a record of one or more communications having occurred between the first user and the second user.

24. A data processing system for notifying a user of changes to specific portions of an electronic content identified as being of relevance to the user, the system comprising:

at least one processor; and one or more computer readable media including instructions which, when executed by the at least one processor, cause the at least one processor to:

receive an indication of the user accessing an electronic document;

determine that one or more modification events have occurred in connection with the electronic content;

present to the user, in response to the determination that one or more modification events have occurred, a user interface identifying each portion of the electronic document that is associated with the one or more modification events, wherein identifying the one or more modification events includes identifying modification events associated with the specific portions in a presentation format that differs from a default format used to identify other modification events, and wherein the user interface includes a summary of only the modification events associated with the specific portions and an indication of the relevance of each modification to the user, wherein the indication includes a confidence value indicative of an inferred relevance of the modification to the user, and prevent from being displayed, to the user, the user interface including a representation of the one or more modification events, in response to a determination that the one or more modification events have occurred but fail to include a high likelihood of being relevant to the user, as determined by a machine learning model, wherein the instructions, when executed by the at least one processor, cause the at least one processor to query the user as to whether the determination that the one or more modification events do not include a high likelihood of being relevant to the user is correct, and, based upon an indication by the user that the determination is not correct, allowing the user interface to be displayed to the user, and updating the machine learning model.

25. The system of claim 24, wherein the presentation format includes highlighted text.

26. The system of claim 24, wherein the instructions further cause the at least one processor to present the electronic content in a first region of the user interface and a notification in a second region of the user interface, the notification including a summary of only the modification events associated with the specific portions.

27. The system of claim 26, wherein the summary is presented as a timeline of changes made to the specific portions.

28. The system of claim 26, wherein the summary includes a listing of changes made to the specific portions over a period of time.

* * * * *